United States Patent
Yoshida et al.

(10) Patent No.: US 12,437,616 B2
(45) Date of Patent: Oct. 7, 2025

(54) PROGRAM, METHOD, INFORMATION PROCESSING DEVICE, AND SYSTEM FOR A TRANSPARENT DISPLAY MEDIUM

(71) Applicant: The Pokémon Company, Tokyo (JP)

(72) Inventors: Masao Yoshida, Tokyo (JP); Yasuhiko Teramoto, Tokyo (JP); Akira Kyozuka, Tokyo (JP); Wakana Kishi, Tokyo (JP)

(73) Assignee: THE POKÉMON COMPANY, Tokyo (JP)

( * ) Notice: Subject to any disclaimer, the term of this patent is extended or adjusted under 35 U.S.C. 154(b) by 294 days.

(21) Appl. No.: 18/107,017

(22) Filed: Feb. 8, 2023

(65) Prior Publication Data

US 2023/0186737 A1    Jun. 15, 2023

Related U.S. Application Data

(63) Continuation of application No. PCT/JP2021/037510, filed on Oct. 11, 2021.

(30) Foreign Application Priority Data

Oct. 12, 2020  (JP) ................................. 2020-171883

(51) Int. Cl.
  *G07G 1/01*    (2006.01)
  *G06Q 20/20*   (2012.01)
  *G07G 1/12*    (2006.01)

(52) U.S. Cl.
  CPC .............. *G07G 1/01* (2013.01); *G06Q 20/202* (2013.01); *G07G 1/12* (2013.01)

(58) Field of Classification Search
  CPC .......... G07G 1/01; G07G 1/12; G07G 1/0045; G06Q 20/202; G06Q 20/20; G06F 3/01; G06F 3/0346
  (Continued)

(56) References Cited

U.S. PATENT DOCUMENTS

| | | | |
|---|---|---|---|
| 10,430,460 B2 | 10/2019 | Sauvé et al. | |
| 2011/0131088 A1* | 6/2011 | Oe | G06Q 30/02 705/26.8 |
| 2020/0285044 A1* | 9/2020 | Noguchi | B60K 35/22 |

FOREIGN PATENT DOCUMENTS

| | | |
|---|---|---|
| JP | 63-150798 A | 6/1988 |
| JP | 2003-067834 A | 3/2003 |

(Continued)

OTHER PUBLICATIONS

Dos Santos, Maria Ines Fernandes Paz Antunes. The Impact of Visual Elements of Package on Consumers Purchase Intent and the Mediating Role of Perceived Risk: An Analysis on Food Packaged Products. Universidade Catolica Portuguesa (Portugal) ProQuest Dissertations & Theses, 2018. (Year: 2018).*

(Continued)

*Primary Examiner* — Fawaad Haider
(74) *Attorney, Agent, or Firm* — XSENSUS LLP

(57) ABSTRACT

A customer is provided with a superior shopping experience while realizing hygiene management by using a transparent display medium with a point-of-sale (POS) terminal. Processing circuitry is configured to receive input relating to payment for a product from a first party, and display an (Continued)

image of an effect corresponding to the input relating to payment on the transparent display medium disposed so as to separate the first party from a second party who is purchasing the product.

15 Claims, 21 Drawing Sheets

(58) Field of Classification Search
USPC .......................................................... 705/16
See application file for complete search history.

(56) References Cited

FOREIGN PATENT DOCUMENTS

| JP | 2004-184979 | A |   | 7/2004 |
|----|-------------|---|---|--------|
| JP | 2004-286990 | A |   | 10/2004 |
| JP | 3152493 | U | * | 8/2009 |
| JP | 2011-113549 | A |   | 6/2011 |
| JP | 2013-254518 | A |   | 12/2013 |
| JP | 2016-115202 | A |   | 6/2016 |
| JP | 2016-136199 | A |   | 7/2016 |
| JP | 2017-084416 | A |   | 5/2017 |
| JP | 2017-515186 | A |   | 6/2017 |
| JP | 2018-028851 | A |   | 2/2018 |
| JP | 2019185826 | A | * | 10/2019 |
| JP | 2020-071519 | A |   | 5/2020 |
| JP | 2020-071549 | A |   | 5/2020 |
| JP | 2020-072159 | A |   | 5/2020 |
| JP | 2020-142753 | A |   | 9/2020 |

OTHER PUBLICATIONS

Parekh, Pranav et al. Systematic review and meta-analysis of augmented reality in medicine, retail, and games. Visual Computing for Industry, Biomedicine, and Art. 2020. (Year: 2020).*

International Search Report and Written Opinion mailed on Nov. 16, 2021, received for PCT Application PCT/JP2021/037510, filed on Oct. 11, 2021, 12 pages including English Translation.

"LG transparent display refrigerator", YouTube (online) (video), URL, https://www.youtube.com/watch?v=J2ss0O8pwuo, Mar. 18, 2015, Posted by: Yasuji Eguchi, 2 pages including English Translation.

"Panasonic transparent display CEATEC2016" YouTube (online) (video), URL, https://www.youtube.com/watch?v=51ZGVtuu8fg, Oct. 5, 2016, Posted by: Kazumichi Moriyama, 2 pages including English Translation.

"Ilt's like an image floating in space! "Transparent screen" that expands the possibilities of displays", DNP, Discover DNP Editorial Department, Available Online At: https://www.dnp.co.jp/media/detail/1191330_1563.html, Jun. 4, 2019, pp. 1-5 (11 pages including English Translation).

Notice of Reasons for Refusal mailed on Nov. 8, 2021, received for JP Application 2020-171883, 9 pages including English Translation.

Notice of Reasons for Refusal mailed on Jan. 11, 2022, received for JP Application 2020-171883, 12 pages including English Translation.

Decision of Refusal mailed on Mar. 22, 2022, received for JP Application 2020-171883, 10 pages including English Translation.

English translation of Written Opinion mailed on Nov. 16, 2021, in corresponding PCT Application PCT/JP2021/037510, 5 pages.

* cited by examiner

Fig. 4

| CUSTOMER ID | NAME | AGE | ADDRESS | DATE OF BIRTH | EMAIL ADDRESS | REGISTRATION DATE | MOST RECENT STORE VISIT | INTENDED DATE OF STORE VISIT | FAVORITE CHARACTER |
|---|---|---|---|---|---|---|---|---|---|
| #1A2B3C | AAAA | A1 | Ad1 | 20YY/MM/DD | Email1 | 20YY/MM/DD | 20YY/MM/DD | 20YY/MM/DD | CHARACTER A |
| #6D7E8F | BBBB | A2 | Ad2 | 20YY/MM/DD | Email2 | 20YY/MM/DD | 20YY/MM/DD | - | CHARACTER B |
| #7H8I9J | CCCC | A3 | Ad3 | 20YY/MM/DD | Email3 | 20YY/MM/DD | 20YY/MM/DD | - | CHARACTER C |
| ... | ... | ... | ... | ... | | ... | ... | ... | ... |

CUSTOMER INFORMATION DB (281)

Fig. 5

| PRODUCT INFORMATION ID | | | | | |
|---|---|---|---|---|---|
| PRODUCT ID | PRODUCT NAME | PRICE | RELEASE DATE | DELIVERY SCHEDULE | INVENTORY |
| #1B2C3D | AAAA | P1 | 20YY/MM/DD | 20YY/MM/DD | N1 |
| #4E5F6G | BBBB | P2 | 20YY/MM/DD | 20YY/MM/DD | N2 |
| #7I8J9K | CCCC | P3 | 20YY/MM/DD | 20YY/MM/DD | N3 |
| ... | ... | | ... | ... | |

PROGRAM, METHOD, INFORMATION PROCESSING DEVICE, AND SYSTEM FOR A TRANSPARENT DISPLAY MEDIUM

CROSS-REFERENCE TO RELATED APPLICATION

This application is a continuation of International Application No. PCT/JP2021/037510, filed Oct. 11, 2021, which claims priority to JP 2020-171883, filed Oct. 12, 2020, the entire contents of each are incorporated herein reference.

TECHNICAL FIELD

The present disclosure relates to a program, a method, an information processing device, and a system for a transparent display medium.

BACKGROUND

Recently, due to concerns about viral infections, transparent shields are sometimes provided between people in situations where people converse in close proximity. For example, when dining with an acquaintance, a transparent shield is provided between oneself and the acquaintance, or when paying at a store, a transparent shield is provided between the salesperson and the customer.

CITATION LIST

Patent Literature

[PTL 1] Japanese Patent Application Publication No. 2004-1849793

SUMMARY

Technical Problems

When a shield is provided between the salesperson and the customer during payment, it is difficult for the voice of the salesperson to reach the customer. Moreover, the customer may be offended by the salesperson taking the lead in the conversation. Hence, it may be difficult to realize the communication that would have taken place between the salesperson and the customer had the shield not been there, and as a result, the enjoyment of the customer when shopping may decrease.

PTL 1 describes a transparent screen that is disposed near a cash register and displays advertising information and so on. However, PTL 1 does not disclose disposing the screen between a salesperson and a customer.

Hence, an object of the present disclosure is to provide a customer with a superior shopping experience while realizing hygiene management.

Solutions to Problems

Provided is a program for causing a computer having a processor and a memory to execute processing. The program causes the processor to execute a step for receiving input relating to payment for a product from a first party, and a step for displaying an image of an effect corresponding to the input relating to payment on a transparent display medium disposed so as to separate the first party from a second party who is purchasing the product.

Advantages

According to the present disclosure, it is possible to provide the customer with a superior shopping experience while realizing hygiene management.

BRIEF DESCRIPTION OF DRAWINGS

FIG. 4 is a diagram illustrating a data structure of a customer information DB.

FIG. 5 is a diagram illustrating a data structure of a product information DB.

DETAILED DESCRIPTION

An embodiment of the present disclosure will be described below with reference to the drawings. In the following description, identical components have been allocated identical reference signs. The names and functions thereof are also identical. Accordingly, detailed description thereof will not be repeated.

<Outline>

A system according to this embodiment is a system that includes a POS (Point of Sale) terminal and a transparent display medium disposed between a customer and a salesperson, and displays images on the transparent display medium. For example, the images displayed on the transparent display medium are effect images for enhancing the experience during payment or images for improving the payment operation.

<1 Diagram Showing Overall Configuration of System>

Figure 1:
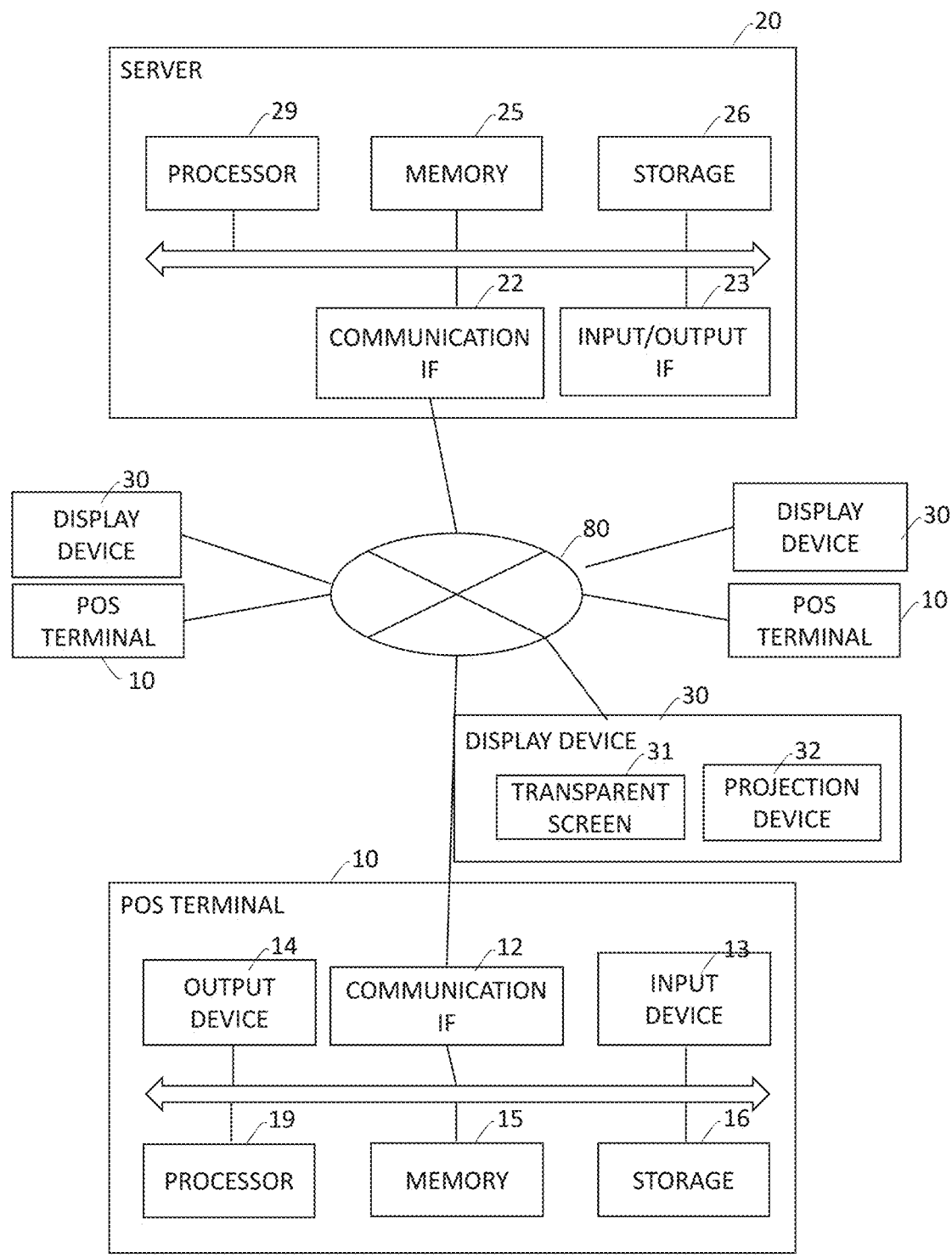
FIG. 1 is a block diagram illustrating an overall configuration of a system.

FIG. 1 is a block diagram showing an example of the overall configuration of a system 1. The system 1 shown in FIG. 1 includes a plurality of POS (Point of Sale) terminals 10, a server 20, and a plurality of display devices 30. The POS terminals 10, the server 20, and the display devices 30 are communicatively connected to each other through a network 80. Note that the display devices 30 may be connected to the POS terminal 10 directly, by wire, or wirelessly rather than through the network 80.

FIG. 1 shows an example in which the system 1 includes three POS terminals 10 and three display devices 30, but the numbers of POS terminals 10 and display devices 30 included in the system 1 are not limited to three. Fewer than three or more than three POS terminals 10 and display devices 30 may be provided. Alternatively, a plurality of display devices 30 may be disposed in relation to the POS terminal 10. Alternatively, one display device 30 may be disposed in relation to a plurality of POS terminals 10.

In this embodiment, a single server may be provided for a set of a plurality of devices. A method for distributing a plurality of functions required for realizing the server 20 according to this embodiment to one or a plurality of pieces of hardware can be determined as appropriate in consideration of the processing capacity of each piece of hardware and/or specifications required of an information processing device (e.g., the POS terminal 10), and so on.

The POS terminal 10 is a device that is operated when a salesperson in a store takes a payment, for example. The POS terminal 10 may be a specialized terminal used for payments or an information processing device installed with a payment application. For example, the information processing device may be a portable terminal such as a smartphone or a tablet, a stationary PC (Personal Computer), or a laptop PC.

The POS terminal 10 includes a communication IF (Interface) 12, an input device 13, an output device 14, a memory 15, storage 16, and a processor 19.

The communication IF 12 is an interface through which signals are input and output to enable the POS terminal 10 to communicate with an external device.

The input device 13 is a device (for example, a touch panel, a touch pad, a pointing device such as a mouse, a keyboard, or the like) for receiving input operations from the salesperson. The input device 13 is also a reader used for reading information about a product.

The output device 14 is a device (a display, a speaker, or the like) used for presenting information to the salesperson.

The memory 15 is a volatile memory such as a DRAM (Dynamic Random Access Memory), for example, that is used to temporarily store a program, data processed by the program or the like, and so on.

The storage 16 is a flash memory or an HDD (Hard Disc Drive), for example, that is used to store data.

The processor 19 is hardware used to execute a command set described in the program, and is constituted by a computation device, a register, a peripheral circuit, and so on.

The server 20 is a device for managing product information about products sold in the store and information relating to registered customers, for example. The server 20 also manages information about images displayed on the display device 30.

The server 20 includes a communication IF 22, an input/output IF 23, a memory 25, storage 26, and a processor 29.

The communication IF 22 is an interface through which signals are input and output to enable the server 20 to communicate with an external device.

The input/output IF 23 functions as an interface between an input device for receiving an input operation from a user and an output device for presenting information to the user.

The memory 25 is a volatile memory such as a DRAM (Dynamic Random Access Memory), for example, that is used to temporarily store a program, data processed by the program or the like, and so on.

The storage 26 is a flash memory or an HDD (Hard Disc Drive), for example, that is used to store data.

The processor 29 is hardware used to execute a command set described in the program and is constituted by a calculation device, a register, a peripheral circuit, and so on.

The display device 30 is a device for displaying images on a transparent display medium disposed between a customer visiting a store and a salesperson when the customer pays for a purchase. For example, the transparent display medium is a transparent material with a thickness of approximately several mm, and is configured such that the customer and the salesperson can recognize each other's faces through the display medium. The transparent display medium serves to prevent droplets that are scattered when the customer and the salesperson converse from reaching the customer and the salesperson, for example. The display device 30 displays the images on the basis of control from the POS terminal 10.

The transparent display medium is realized by a transparent screen, a transparent display, or the like, for example. The transparent display is realized by transmissive organic EL, transmissive inorganic EL, transmissive liquid crystal, or the like, for example. In this embodiment, an example in which the display device 30 uses a transparent screen 31 will be described.

When the display device 30 uses the transparent screen 31, the display device 30 includes a projection device 32 for projecting images onto the transparent screen 31. The projection device 32 projects images onto the transparent screen 31 on the basis of control from the POS terminal 10. The projection device 32 is disposed in a position where light projected by the projection device 32 is not emitted onto the customer or the salesperson.

<1.1 Configuration of POS Terminal>

Figure 2:
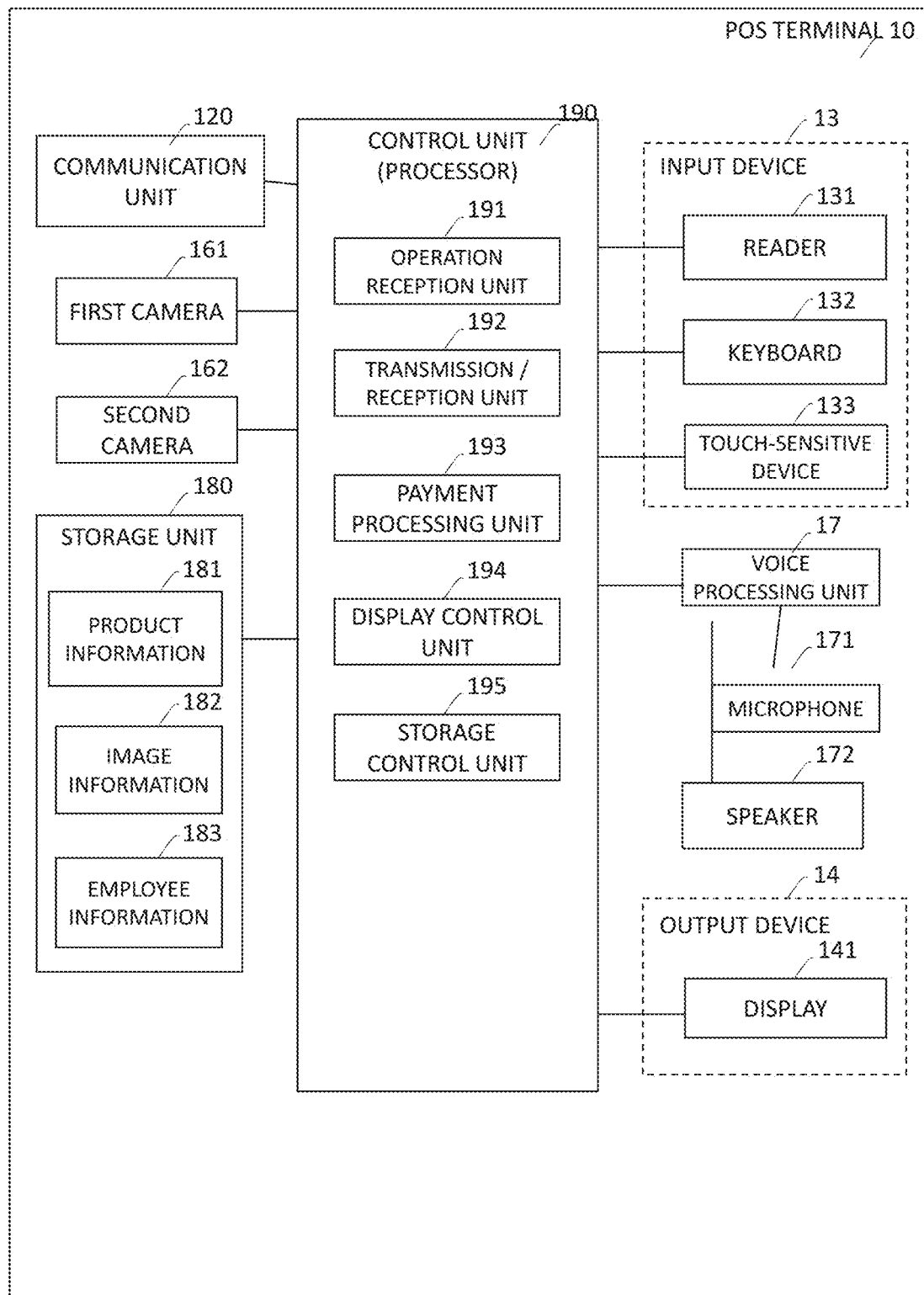
FIG. 2 is a block diagram illustrating a configuration of a POS terminal shown in FIG. 1.

FIG. 2 is a block diagram illustrating an example configuration of the POS terminal 10 shown in FIG. 1. As shown in FIG. 2, the POS terminal 10 includes a communication unit 120, an input device 13, an output device 14, a voice processing unit 17, a microphone 171, a speaker 172, a first camera 161, a second camera 162, a storage unit 180, and a control unit 190. The respective blocks included in the POS terminal 10 are electrically connected by a bus or the like, for example.

The communication unit 120 performs processing such as modulation/demodulation processing for enabling the POS terminal 10 to communicate with another device. The communication unit 120 implements transmission processing on signals generated by the control unit 190 so as to transmit the signals to the outside (to the server 20 or the display device 30, for example). The communication unit 120 implements reception processing on signals received from the outside and outputs the received signals to the control unit 190.

The input device 13 is a device for receiving instructions or information input by the salesperson operating the POS terminal 10. The input device 13 is realized by a reader 131, a keyboard 132, a touch-sensitive device 133 into which instructions are input by touching an operation surface, and so on, for example. The input device 13 converts an instruction or information input from the salesperson into an electric signal and outputs the electric signal to the control unit 190. Note that the input device 13 may include a reception port for receiving electric signals input from an external input device, for example. The input device 13 may also include a switch button for switching the content displayed on the display device 30.

The reader 131 is a device for reading information attached to a product. For example, the reader 131 optically reads an optical code attached to the product. Alternatively, the reader 131 may read the information attached to the product using short-range wireless communication. In this case, a wireless tag on which information about the product is written is attached to the product. The reader 131 reads the information from the wireless tag by irradiating the product to which the wireless tag is attached with radio waves and receiving radio waves reflected from the wireless tag.

Further, the reader 131 is a device for reading identification information assigned to the customer, for example a customer ID. The reader 131 reads an image relating to the identification information, which is displayed on a portable terminal carried by the customer, for example. Alternatively, the reader 131 reads identification information stored on an IC card or a magnetic card, for example.

The output device 14 is a device for presenting information to the salesperson operating the POS terminal 10. The output device 14 is realized by a display 141 or the like, for example. The display 141 displays data relating to payment processing under the control of the control unit 190. The display 141 is realized by an LCD (Liquid Crystal Display) or an organic EL (Electro-Luminescence) display or the like, for example.

The voice processing unit 17 performs digital-analog conversion processing on a voice signal, for example. The voice processing unit 17 converts a signal provided from the microphone 171 into a digital signal and provides the converted signal to the control unit 190. The voice processing unit 17 also provides the voice signal to the speaker 172. The voice processing unit 17 is realized by a processor used for voice processing, for example. The microphone 171 receives voice input and provides a voice signal corresponding to the voice input to the voice processing unit 17. The speaker 172 converts the voice signal provided from the voice processing unit 17 into a voice and outputs the voice to the outside of the POS terminal 10.

The first camera 161 is a device for receiving light using a light reception element and outputting the light as an imaging signal. The first camera 161 is disposed in a position where images can be captured of the operations performed by the customer during payment, for example. The second camera 162 is a device for receiving light using a light reception element and outputting the light as an imaging signal. The second camera 162 is disposed in a position where images can be captured of the operations performed by the salesperson during payment, for example.

The storage unit 180 is realized by the memory 15, the storage 16, and so on, for example, and stores data and programs used by the POS terminal 10. For example, the storage unit 180 stores product information 181, image information 182, and employee information 183.

The product information 181 is information relating to the products sold at the store. The information relating to the products includes, for example, information identifying the product, the product name, the product price, the product release date, the next scheduled product delivery date, the inventory, and so on.

The image information 182 is information relating to the images displayed on the display device 30. The information relating to the images includes, for example, an image associated with the product, an image associated with the employee using the POS terminal 10, and so on.

The employee information 183 is information relating to the employee using the POS terminal 10. The information relating to the employee includes, for example, information identifying the employee, the employee name, a character registered in relation to the employee, and so on.

The control unit 190 is realized by the processor 19 by reading a program stored in the storage unit 180 and executing commands included in the program. The control unit 190 controls the operations of the POS terminal 10. The control unit 190 operates in accordance with the program so as to exhibit the functions of an operation reception unit 191, a transmission and reception unit 192, a payment processing unit 193, a display control unit 194, and a storage control unit 195.

The operation reception unit 191 performs processing for receiving instructions or information input from the input device 13. More specifically, for example, the operation reception unit 191 receives information based on an instruction input from the keyboard 132, the touch-sensitive device 133, or the like. The instruction input through the keyboard 132, the touch-sensitive device 133, or the like is information relating to the product, information relating to payment processing, information relating to the customer, information relating to control of the display device 30, or the like, for example. The operation reception unit 191 also receives information read from the product by the reader 131 or customer-related information read by the reader 131.

The operation reception unit 191 also receives salesperson operations captured by the second camera 162 or receives salesperson operations on the basis of the positions of the hands (fingers). The salesperson operations include, for example, operations relating to payment processing, operations relating to control of the display device 30, and so on. Further, the operation reception unit 191 receives customer operations captured by the first camera 161 or receives customer operations on the basis of the positions of the hands (fingers). The customer operations include, for example, an operation for replying to a question asked by the salesperson during the payment processing, and so on.

The operation reception unit 191 also receives voice instructions input from the microphone 171. More specifically, for example, the operation reception unit 191 receives a voice signal input from the microphone 171 and converted into a digital signal by the voice processing unit 17. The operation reception unit 191 acquires instructions from the salesperson by analyzing the received voice signal and extracting predetermined nouns, for example.

The transmission and reception unit 192 performs processing for enabling the POS terminal 10 to transmit and receive data to and from an external device such as the server 20 in accordance with a communication protocol.

The payment processing unit 193 performs payment-related processing in response to an instruction input from the salesperson. For example, the payment processing unit 193 acquires product information from the product information 181 on the basis of information input from the keyboard 132, the touch-sensitive device 133, or the like, or the information read by the reader 131. The payment processing unit 193 then stores information indicating that the acquired product has been purchased by the customer in a purchase information database. Further, the payment processing unit 193 updates the product information 181 in response to purchase of the product.

The display control unit 194 controls the output device 14 in order to present payment-related information to the salesperson. More specifically, for example, the display control unit 194 displays the product information read from the product information 181 by the payment processing unit 193 on the display 141. The display control unit 194 also displays information relating to the payment processing implemented by the payment processing unit 193 on the display 141.

Furthermore, the display control unit 194 controls the display device 30 in order to present payment-related information to the customer. More specifically, for example, the display control unit 194 displays an image of an effect for enhancing the experience of the customer during payment or an image for improving the payment operation performed by the salesperson on the display device 30.

The image of the effect for enhancing the experience of the customer during payment is an image having high entertainment value, which allows the customer to enjoy shopping even during payment, for example. The image includes the following images, for example.

An image of a character related to the customer
An image of a character related to the salesperson
An image of a character related to the POS terminal 10
An image related to the situation during payment
An image of a character related to the product The image for improving the payment operation performed by the salesperson is an image for smoothing the payment operation performed by the salesperson, for example. When a screen for preventing droplets that are scattered when the customer and the salesperson converse is disposed between the customer and the salesperson, it is difficult for the voice of the salesperson to reach the customer and difficult for the replies of the customer to reach the salesperson. In order to provide support in such a situation, the image for improving the payment operation performed by the salesperson includes the following images, for example.

An image showing items to be checked in an enlarged, easy-to-understand fashion
An image representing state transitions of the payment
An image highlighting an available cash register Furthermore, the display control unit 194 switches the content displayed on the display device 30 on the basis of an instruction from the salesperson. More specifically, the display control unit 194 switches the content displayed on the display device 30 on the basis of an instruction input from the keyboard 132 or the touch-sensitive device 133, a salesperson operation captured by the second camera 162, or a salesperson operation detected from the positions of the hands (fingers) or the like. The display control unit 194 also switches the content displayed on the display device 30 on the basis of a voice picked up by the microphone 171. For example, the display control unit 194 switches the display on the basis of an instruction from the salesperson so as to display an image corresponding to the following processing. Note that the image display may be switched automatically in response to a changeover of the processing.

The display control unit 194 may also switch the display content so that the displayed character changes. The display control unit 194 may also switch the display content so that the background of the displayed character changes.

The display control unit 194 may also switch the display of high-entertainment value images on and off. The high-entertainment value images can improve the degree of customer satisfaction during payment but may also cause a delay in the payment processing. Therefore, for example, the number of customers in the store or the number of customers waiting to complete payment processing is recognized, and when the number of customers reaches a predetermined number, the display of high-entertainment value images is automatically switched off. In so doing, delays in the payment processing can be suppressed in accordance with the situation in the store. Note that the display of high-entertainment value images may also be switched on and off on the basis of an instruction operation from the salesperson.

Furthermore, the display control unit 194 may modify the display position of the image on the transparent screen 31. More specifically, for example, the display control unit 194 displays the image at a height that is appropriate for the height of the customer performing payment. The display control unit 194 modifies the display position of the display device 30 on the basis of an instruction input from the keyboard 132 or the touch-sensitive device 133, a salesperson operation captured by the second camera 162, or a salesperson operation detected from the positions of the hands (fingers) or the like, for example. Alternatively, for example, the display position of the image may be set in advance in stages, and the display control unit 194 may set the display position automatically in accordance with the height of the customer.

Alternatively, for example, the display control unit 194 may shift the display position of the image slightly for each customer performing payment. For example, the customer may touch the transparent screen 31 when the customer selects an option displayed on the transparent screen 31. The display control unit 194 shifts the display position of the image several cm horizontally, for example, so that the next customer does not touch the same position as the previous customer on the transparent screen 31. In so doing, it is possible to prevent customers from touching the same position on the transparent screen 31 when selecting options. Note that the number of payments following the most recent disinfection operation may be stored, and when a predetermined number of people have completed payments, or in other words when the display position has been shifted horizontally a predetermined number of times, the display control unit 194 may display a suggestion to disinfect the surface of the transparent screen 31 to the salesperson.

The storage control unit 195 controls the storage of data in the storage unit 180. For example, the storage control unit 195 updates the product information 181, the image information 182, or the employee information 183 on the basis of data provided from the server 20.

<1.2 Functional Configuration of Server>

Figure 3:
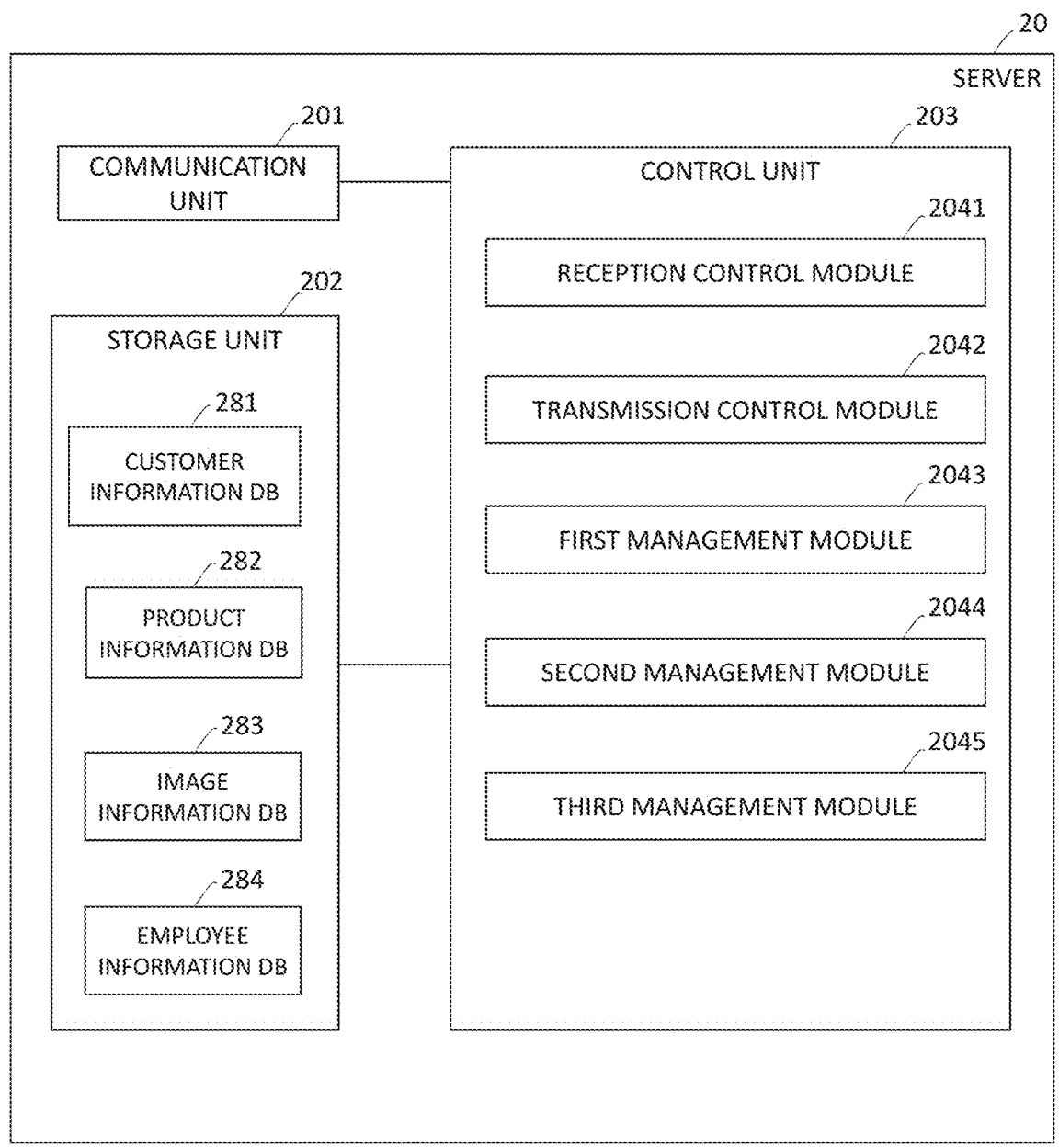
FIG. 3 is a diagram illustrating a functional configuration of a server.

FIG. 3 is a diagram illustrating a functional configuration of the server 20. As illustrated in FIG. 3, the server 20 exhibits the functions of a communication unit 201, a storage unit 202, and a control unit 203.

The communication unit 201 performs processing for enabling the server 20 to communicate with an external device.

The storage unit 202 includes databases in which payment-related data are accumulated, for example a customer information database (DB) 281, a product information database (DB) 282, an image information database (DB) 283, an employee information database (DB) 284, and so on.

The customer information DB 281 is a database for storing personal information about customers who purchase products. Details thereof will be described below.

The product information DB 282 is a database for storing information about the products for sale. Details thereof will be described below.

The image information DB 283 is a database for storing information about the images displayed on the display device 30.

The employee information DB 284 is a database for storing information about employees.

The control unit 203 is realized by the processor 29 by reading the program stored in the storage unit 202 and executing commands included in the program. The control unit 203 operates in accordance with the program so as to function as a reception control module 2041, a transmission control module 2042, a first management module 2043, a second management module 2044, and a third management module 2045.

The reception control module 2041 controls processing by which the server 20 receives signals from an external device in accordance with a communication protocol.

The transmission control module 2042 controls processing by which the server 20 transmits signals to an external device in accordance with a communication protocol.

The first management module 2043 manages the customer information DB 281. For example, when information is input from a terminal held by the customer, the first management module 2043 updates the customer information DB 281 on the basis of the input information.

More specifically, for example, when an instruction to register customer information is input from the terminal held by the customer, the first management module 2043 stores information input in accordance with a registration form in the customer information DB 281. The information input at this time includes information relating to a favorite character of the customer, for example.

The information relating to a favorite character may be input in various modes and is not limited to input on a registration form. For example, the first management module 2043 may receive specification of a character from the customer in a selection format. More specifically, for example, the first management module 2043 may prompt the customer to select at least one character from a plurality of characters in a questionnaire format and store the selected character in the customer information DB 281 as a favorite character.

Alternatively, for example, the first management module 2043 may receive information about the character in conjunction with related media. More specifically, for example, the first management module 2043 may acquire information about a game executed on a portable terminal such as a smartphone or a predetermined game device, and store characters having a predetermined relationship, such as characters who becomes friends in the game or join a party, in the customer information DB 281 as favorite characters. Alternatively, for example, the first management module 2043 may store characters relating to goods distributed from a predetermined arcade game device in the customer information DB 281 as favorite characters.

Alternatively, when an instruction to modify the customer information is input from the terminal held by the customer, the first management module 2043 stores information input in accordance with a modification form in the customer information DB 281. Alternatively, when an instruction to book a visit to the store is input from the terminal held by the customer, the first management module 2043 stores information input in accordance with a booking form in the customer information DB 281.

The second management module 2044 manages the product information DB 282. For example, the second management module 2044, having received information relating to a product being sold, updates the product information DB 282 on the basis of the received information. The information relating to the product includes information relating to a delivered product provided by a product management system, product sales information provided by the POS terminal 10, and so on, for example.

The third management module 2045 manages the image information DB 283. For example, the third management module 2045, having received information relating to an image to be displayed on the display device 30, updates the image information DB 283 on the basis of the received information. The image to be displayed on the display device 30 is provided by the product management system, for example.

More specifically, for example, it is assumed that a predetermined product is associated with an image that will be displayed on the display device 30 when the customer purchases the product. When information relating to the product is provided by the product management system, information relating to the image associated with the product is provided to the server 20. The third management module 2045 stores the provided information relating to the image in the image information DB 283.

Further, for example, when the product with which the image is associated stops being sold, the third management module 2045 deletes the information relating to the image associated with the product from the image information DB 283.

<2 Data Structures>

FIGS. 4 and 5 are diagrams illustrating data structures of the databases stored by the server 20. Note that FIGS. 4 and 5 are examples and do not exclude data not described here.

FIG. 4 is a diagram illustrating the data structure of the customer information DB 281. As shown in FIG. 4, each record of the customer information DB 281 includes a "customer ID" item, a "name" item, an "age" item, an "address" item, a "date of birth" item, an "email address" item, a "registration date" item, a "most recent store visit" item, a "store visit booking date" item, a "favorite character" item, and so on.

Information for identifying the customer is stored in the "customer ID" item. The customer ID is set automatically when the customer information is registered, for example.

The name of the customer is stored in the "name" item.

The age of the customer is stored in the "age" item.

The location at which the customer resides is stored in the "address" item.

The date of birth of the customer is stored in the "date of birth" item.

An email address to be used to send emails to the customer is stored in the "email address" item.

The date on which the customer registered the customer information is stored in the "registration date" item.

The date of the most recent visit of the customer to the store is stored in the "most recent store visit" item.

The date of the next visit of the customer to the store is stored in the "store visit booking date" item. A booking for the next store visit is input from a booking form, for example. Note that the "store visit booking date" item is not limited to a date, and the time or time slot of the store visit may also be stored. Alternatively, the product that the customer intends to purchase may be stored.

The name of a character registered by the customer as a favorite is stored in the "favorite character" item. A plurality of favorite characters may be registered.

FIG. 5 is a diagram illustrating the data structure of the product information DB 282. As shown in FIG. 5, each record of the product information DB 282 includes a "product ID" item, a "product name" item, a "price" item, a "release date" item, a "delivery schedule" item", an "inventory" item, and so on.

Information for identifying a product is stored in the "product ID" item.

The name of the product is stored in the "product name" item.

The selling price of the product is stored in the "price" item.

The date the product was released or the planned release date of the product is stored in the "release date" item.

The next delivery date of the product is stored in the "delivery schedule" item. Note that the next scheduled date may not yet have been decided.

The inventory of the product is stored in the "inventory" item.

<3 Operation>

An operation performed by the POS terminal 10 when an image is displayed on the display device 30 will now be described.

Figure 6:
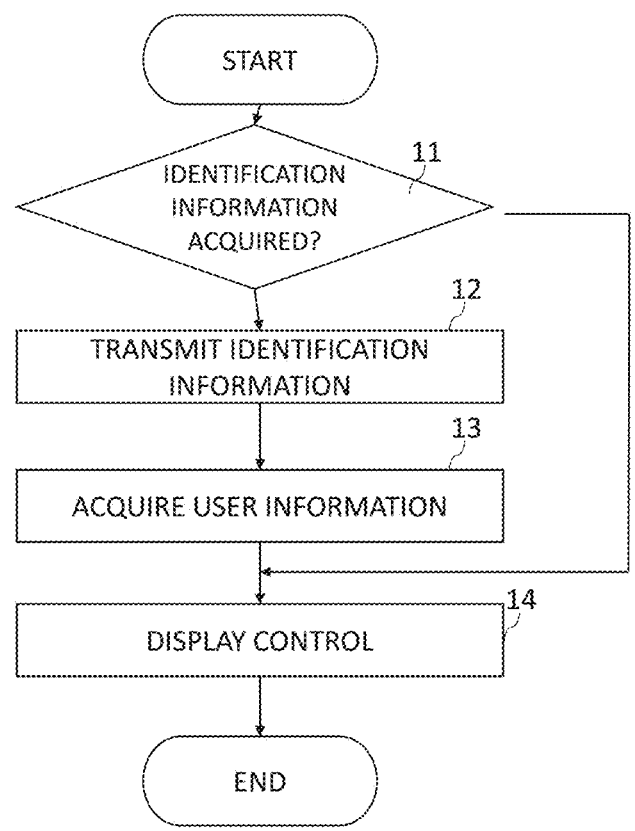
FIG. 6 is a flowchart illustrating an operation of the POS terminal performed when a customer arrives at a payment area.

FIG. 6 is a flowchart showing an example of an operation performed by the POS terminal 10 when a customer arrives at a payment area.

First, actions performed by the customer visiting the store will be described. For example, a user who is planning to go to the store uses a portable terminal owned by the user to access the Internet website of the store. If the user has already completed customer registration, the user accesses a store visit booking website by inputting their login information. The user inputs required items, for example the date of a planned store visit, on a booking form of the store visit booking website. At this time, the booking form may include an area in which it is possible to input the intended time of the store visit or the intended time slot of the store visit. The booking form may also include an area in which it is possible to select a character that the user wants to be displayed during the store visit, for example. The information input on the booking form is transmitted to the server 20 together with the customer ID of the logged-in user.

The first management module 2043 of the server 20, upon receiving the information input on the booking form, updates the customer information DB 281 on the basis of the received information. More specifically, the first management module 2043 stores the input information in the record of the "intended date of store visit" item of the customer identified by the customer ID, for example.

If customer registration has not yet been completed, the user performs customer registration. The user inputs required items, for example name, age, address, date of birth, favorite character, and so on, on a registration form. Once customer registration has been performed, it becomes possible to ascertain information about the customer in advance, and as a result, the customer can shop efficiently and acquire useful information based on the registered information.

The first management module 2043, upon receiving the information input on the registration form, creates a new record in the customer information DB 281 on the basis of the received information.

The user who has booked a store visit visits the store as a customer on the intended store visit date. When the customer arrives at the store, for example, the customer displays information showing that the customer has booked a store visit on the portable terminal and presents the information to a salesperson in the store. Alternatively, the customer may receive confirmation of the store visit booking by displaying their identification information, for example an image showing the customer ID, on the portable terminal and having a predetermined device read the identification information. The customer visiting the store then moves through the store and selects products they wish to buy. The customer places the selected products in a basket and takes the basket in which the products have been placed to the payment area.

Figure 7:
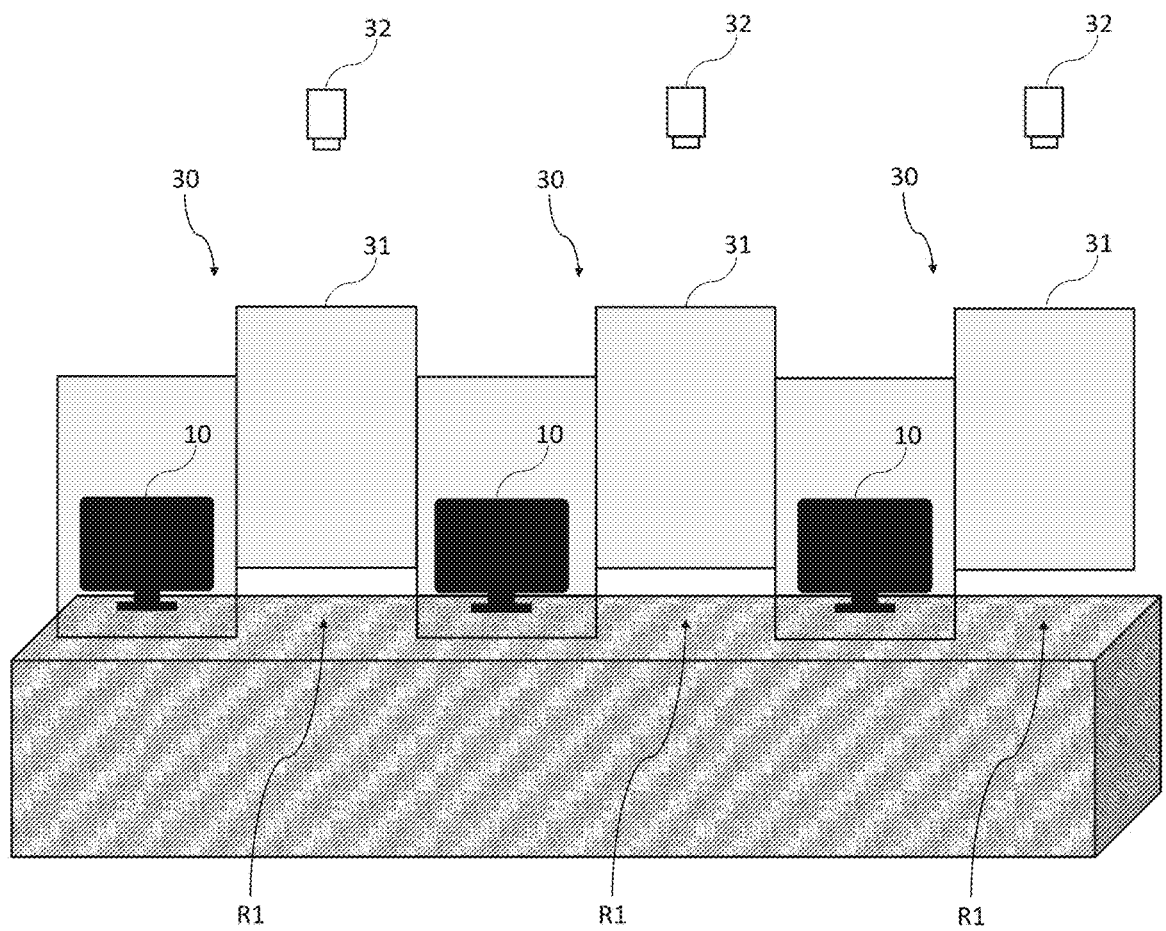
FIG. 7 is a perspective view illustrating the appearance of the payment area.
Figure 8:
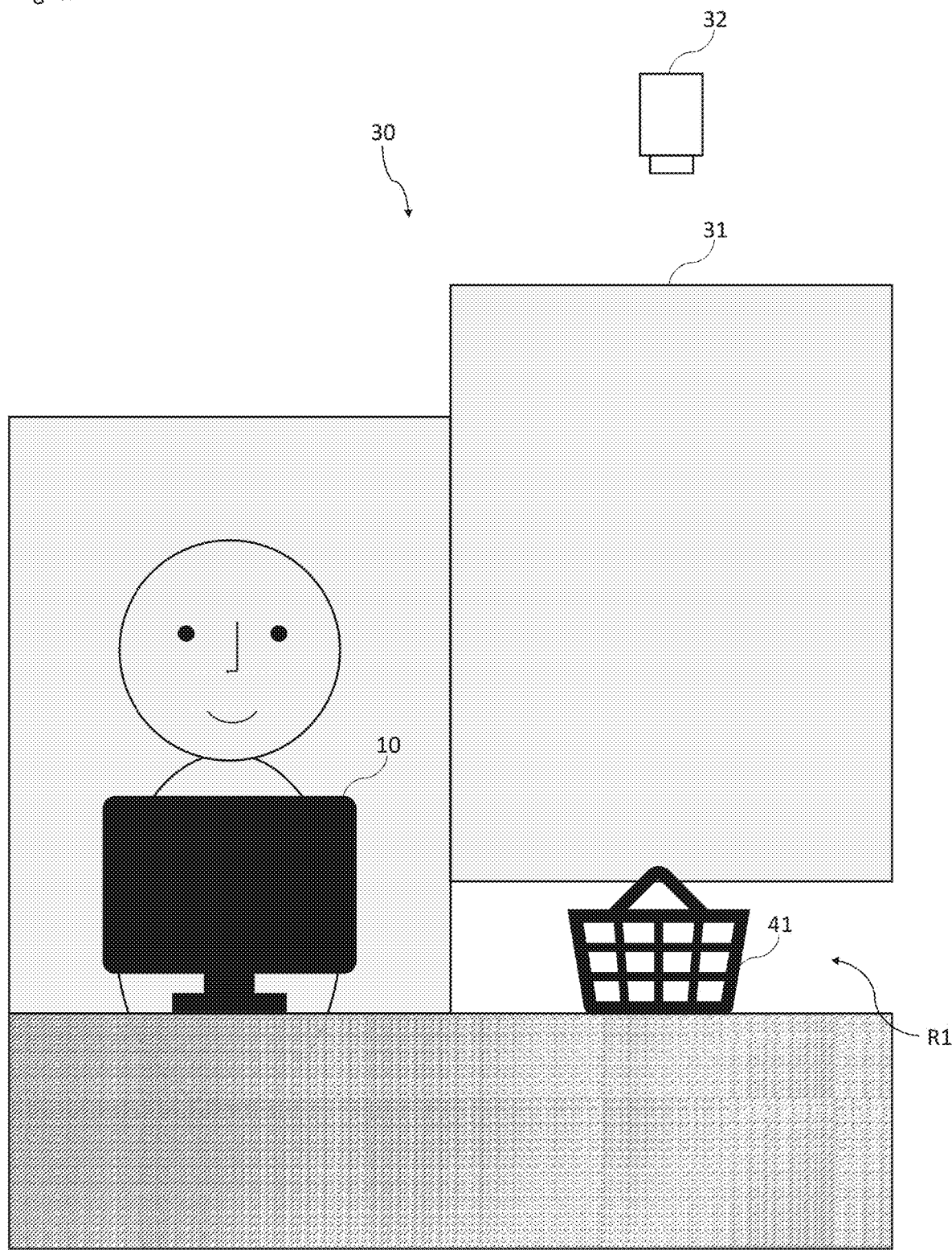
FIG. 8 is a front view illustrating the appearance of the POS terminal, a transparent screen, and a projection device disposed in the payment area.

FIG. 7 is a perspective view illustrating an example of the appearance of the payment area. FIG. 8 is a front view illustrating an example of the appearance of the POS terminal 10, the transparent screen 31, and the projection device 32 disposed in the payment area. Three POS terminals 10 are disposed in the payment area shown in FIG. 7. In the example shown in FIG. 7, the display device 30 is disposed for each POS terminal 10. Note that the arrangement of the POS terminals 10 in the payment area is not limited to the arrangement shown in FIG. 7. For example, in FIG. 7, the POS terminals 10 are arranged in a straight line, but the POS terminals 10 may be arranged in a rectangle. Alternatively, the POS terminals 10 may be arranged so that the salespeople using the POS terminals 10 face each other. Furthermore, the number of POS terminals 10 arranged in the payment area is not limited to three.

As shown in FIGS. 7 and 8, the display device 30 includes the transparent screen 31 and the projection device 32. The transparent screen 31 is constituted by two vertically long screens, for example. A space R1 of a predetermined height is formed between the bottom of one of the two screens and a cash register counter. The height of the space R1 is set on the basis of the height of a basket 41, for example. For example, the height of the space R1 is a height at which the basket 41 can be moved to the side of the salesperson by sliding the basket 41 while the basket 41 is placed on the cash register counter.

Note that the transparent screen 31 is not limited to being constituted by two vertically long screens. The transparent screen 31 may be a single screen. In this case, a space of a predetermined height is formed below the screen.

The projection device 32 is disposed above the transparent screen 31 on the salesperson side. The projection device 32 is disposed so as to be capable of projecting images toward the transparent screen 31 at a predetermined angle from the salesperson side.

The customer carrying the basket 41 moves to a POS terminal 10 at which no customers are paying, among the POS terminals 10 in the payment area, and places the basket 41 on the cash register counter. At this time, the employee information 183 of the salesperson operating the POS terminal 10 is stored in the POS terminal 10. For example, the employee information 183 is read from the employee information DB 284 in the server 20 and stored in the POS terminal 10 when the salesperson operates the POS terminal 10.

The salesperson operating the POS terminal 10 checks whether or not the visiting customer has completed customer registration. For example, when the customer has completed customer registration, the customer displays their identification information, for example the customer ID, on the portable terminal and presents the information to the salesperson. The salesperson reads the display on the presented portable terminal using the reader 131. At this time, the object presented by the customer is not limited to the portable terminal. As long as the identification information can be read, the object may be a card such as an IC card or a magnetic card. When the customer information has not been registered, the customer informs the salesperson that their customer information is not registered. Note that customer registration may be checked using the display device 30. For example, the display control unit 194 displays an image for checking whether or not customer registration has been performed on the display device 30 in response to an instruction from the salesperson. Whether or not customer registration has been performed may also be checked by checking whether or not the customer is carrying a card showing registration.

As shown in FIG. 6, the control unit 190 determines whether or not the customer ID has been acquired using the operation reception unit 191 (step S11). When the customer ID has been acquired (Yes in step S11), the operation reception unit 191 transmits the acquired customer ID to the server 20 (step S12) and requests information about the customer identified by the customer ID from the server 20.

The server 20 reads the information relating to the customer identified by the received customer ID from the customer information DB 281. The server 20 transmits the read information to the POS terminal 10.

The display control unit 194 acquires the customer-related information transmitted from the server 20 (step S13). More specifically, the display control unit 194 acquires the information relating to the date of birth, the information relating to the most recent store visit, the information relating to the favorite character, and so on. The display control unit 194 then controls the display device 30 on the basis of the acquired customer-related information (step S14).

More specifically, for example, the display control unit 194 displays an image of the favorite character of the customer welcoming the customer on the display device 30 on the basis of the acquired information relating to the favorite character. The image used at this time may be a still image or a moving image. The image displayed on the display device 30 is visible not only to the customer but also to the salesperson as a left-right reversed image.

Figure 9:
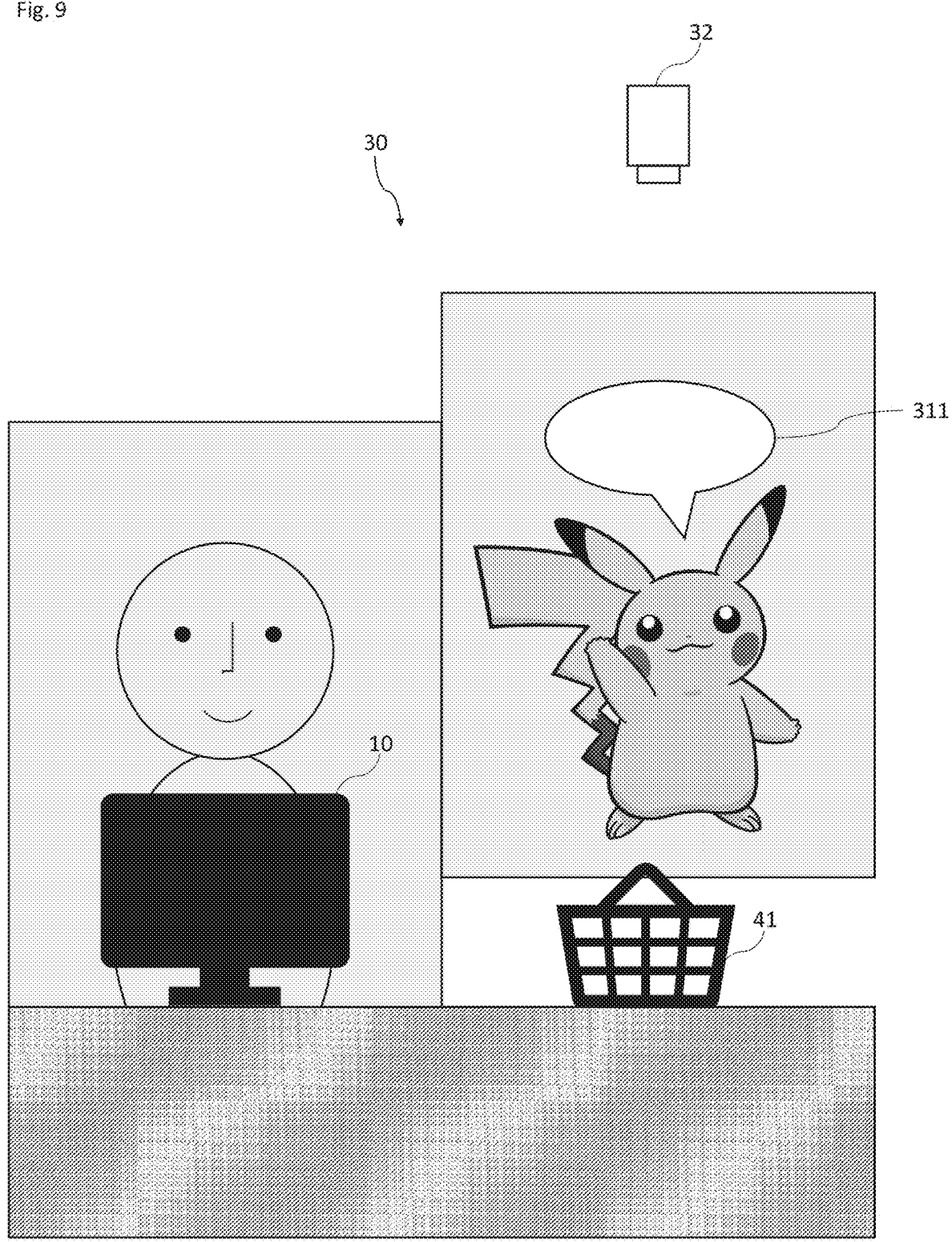
FIG. 9 is a diagram illustrating an image displayed on the transparent screen.

FIG. 9 is a schematic view illustrating an example of the image displayed on the transparent screen 31. The image is projected onto the transparent screen 31 from the projection device 32 and displayed on the transparent screen 31. In FIG. 9, the character and a comment area 311 are displayed on the transparent screen 31.

The display control unit 194 displays a comment welcoming the customer, such as "Welcome", for example, in the comment area 311 of the character. Alternatively, the display control unit 194 displays a comment thanking the customer for their return visit, such as "Thanks for coming again", for example, in the comment area 311 of the character. The comment thanking the customer for their return visit may also be a comment expressing pleasure at seeing the customer again after a long time, such as "Long time no see", for example, based on the information relating to the most recent store visit. Alternatively, the display control unit 194 displays a comment thanking the customer for making a booking, such as "Thanks for booking a visit", for example, in the comment area 311 of the character based on the information relating to the store visit booking. Alternatively, the display control unit 194 displays a comment prompting the customer to perform the next action, such as "Pass the basket through the gap", for example, in the comment area 311 of the character.

Further, when, on the basis of the acquired information relating to the date of birth, the date of the store visit is the customer's birthday or a date near the customer's birthday, the display control unit 194 displays an image on which one or a plurality of characters wish the customer happy birthday is displayed on the display device 30. The characters displayed at this time may include the favorite characters of the customer.

Note that the display control unit 194 may also display an image on which a character specified at the time of the booking welcomes the customer on the display device 30 on the basis of the information relating to the store visit booking.

When customer registration has not been completed, the display control unit 194 displays an image of a preset character welcoming the customer, for example, on the display device 30.

Note that the display control unit 194 may read information about a character set for the salesperson from the employee information 183 and display an image of the read character welcoming the customer on the display device 30.

Figure 10:
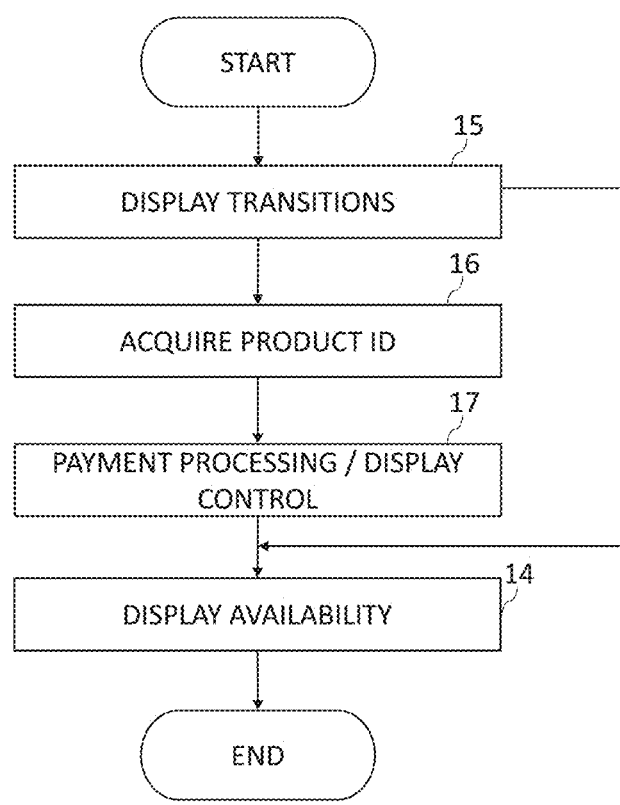
FIG. 10 is a flowchart illustrating an operation of the POS terminal performed during payment processing.

FIG. 10 is a flowchart showing an example of an operation performed by the POS terminal 10 during payment processing.

After displaying a welcome image using a character, the POS terminal 10 displays an image representing the transitions of the payment processing and the current process on the display device 30 (step S15).

Figure 11:
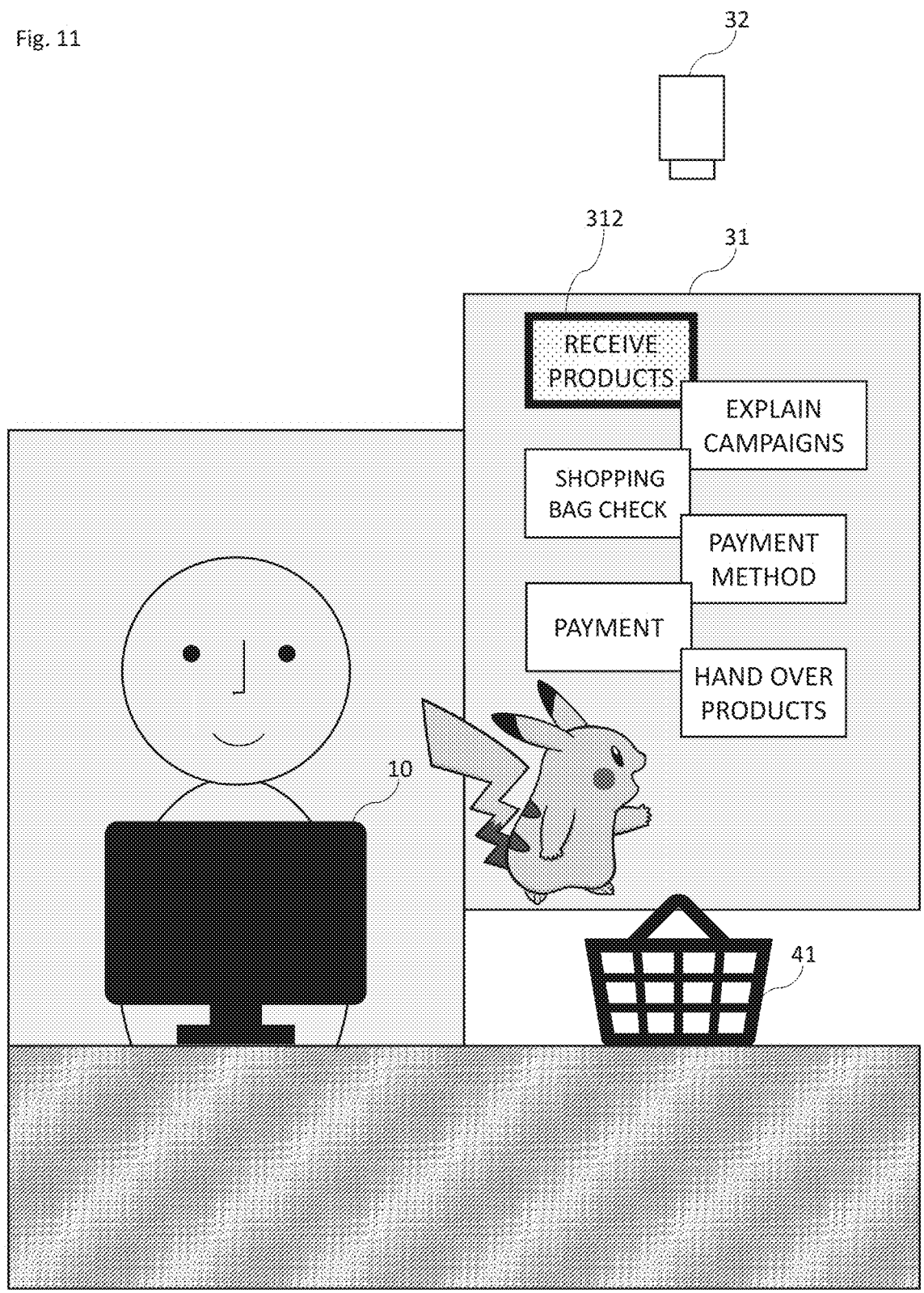
FIG. 11 is a schematic view illustrating an image displayed on the transparent screen.

FIG. 11 is a schematic view illustrating an example of the image displayed on the transparent screen 31. In FIG. 11, transitions between the processes implemented during the payment processing are displayed in a large enough size to be easily visible to the customer performing payment. For example, in FIG. 11, "Receive product", "Explain campaigns", "Shopping bag check", "Payment method", "Payment", and "Hand over product" are displayed in a large enough size to be easily visible to the customer performing payment. Thus, both the customer and the salesperson can understand precisely what the next process will be. As a result, the customer and the salesperson can communicate without stress, even when separated by the transparent screen 31. Note that the processes displayed on the transparent screen 31 are not limited to the processes shown in FIG. 11. Some of the processes may be omitted, and different processes may be included.

Further, the display of the respective processes may be displayed in a large enough size to be easily visible to customers waiting in line to pay in the payment area, for example. In so doing, the customers waiting in line can to a certain extent grasp the processes to be performed during payment before performing the payment processing themselves. As a result, the customers and the salesperson can communicate more quickly than with a conventional configuration.

Furthermore, the display of the respective processes is displayed in a position that can easily be seen by the customers waiting in line to pay in the payment area, for example a comparatively high position. Thus, the display on the transparent screen 31 can easily be seen even from the back of the line. As a result, opportunities to check the processes performed during payment can be increased, making it possible to become accustomed to the procedures of the payment processing before performing the payment processing.

Furthermore, on the display of the respective processes, an instruction object 312 is superimposed on the process currently underway so that the process currently being implemented can easily be ascertained. Thus, the customer can ascertain the position of the current process within the processing as a whole. Moreover, the customers waiting in line can predict how long it will take to complete the payment processing that is currently underway, thereby alleviating the stress of waiting in line.

Furthermore, the display of the respective processes is guided by a character. As a result, the customer pays closer attention to the image displayed on the transparent screen 31.

After checking the image displayed on the transparent screen 31, the customer moves the basket 41 placed on the cash register counter through the space R1 to the side of the salesperson separated by the transparent screen 31.

The payment processing unit 193 of the POS terminal 10 acquires the product IDs of the products in the basket 41 (step S15). More specifically, for example, in a case where the reader 131 reads product IDs using short-range wireless communication, radio waves generated by the reader 131 are emitted in the vicinity of the space R1. When the basket 41 is moved through the space R1 to the salesperson side, the wireless tag attached to the product is irradiated with the radio waves emitted by the reader 131. The wireless tag irradiated with the radio waves transmits radio waves to the reader 131. The payment processing unit 193 acquires information relating to the products in the basket 41, for example the product IDs, on the basis of the radio waves received by the reader 131.

Alternatively, in a case where the reader 131 reads product IDs by reading an optical code, the salesperson uses the reader 131 to read the optical codes attached to the products in the basket 41 moved through the space R1. The payment processing unit 193 acquires information relating to the products, for example the product IDs, on the basis of the optical codes read by the reader 131.

Having acquired the product IDs, the payment processing unit 193 implements payment processing. Further, after acquiring the product IDs, the display control unit 194 implements display control (step S17).

More specifically, for example, the display control unit 194, after acquiring the product IDs, reads the images associated with the product IDs from the image information DB 283 and displays the read images on the display device 30.

Figure 12:
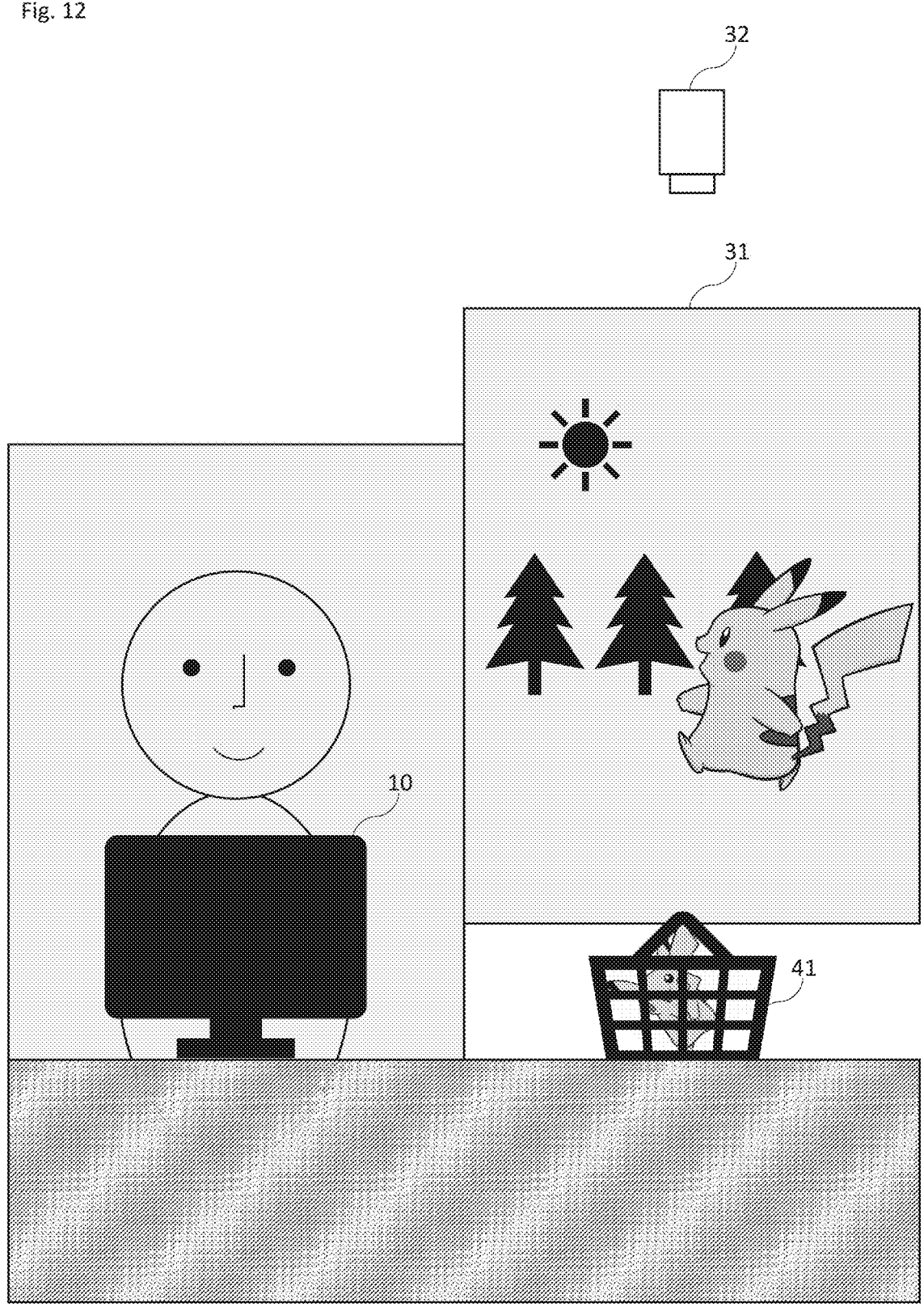
FIG. 12 is a diagram illustrating an image displayed on the transparent screen when a product ID is read by a reader.

FIG. 12 is a diagram illustrating an example of the image displayed on the transparent screen 31 when a product ID is read by the reader 131. In FIG. 12, when information about a soft toy of a character placed in the basket 41 is read by the reader 131, an image associated with the soft toy is displayed. In other words, an image of the same character as the soft toy taking a walk is displayed.

Note that the product and the displayed character do not have to be the same. The product and the displayed character may be different. Moreover, an individual image does not have to be displayed for each product. The number of characters displayed on the transparent screen 31 may be increased every time the number of products for which product IDs are read increases.

Furthermore, the display is not limited to a character image. For example, checking items may be displayed. Some products, such as card packs, for example, are difficult to identify. For products that are difficult to identify, the specific name of the product, for example, is displayed in order to confirm that the product brought to the payment area is correct. Further, when the product is clothing or the like, an image of the character wearing the clothing may be displayed.

Furthermore, image data may be read from the product in addition to the product ID. The display control unit 194 displays an image based on the image data read from the product on the display device 30.

Having acquired the product IDs of all of the products in the basket 41, for example, the payment processing unit 193 explains campaigns that are currently underway. At this time, for example, an image of the instruction object 312 superimposed on "Explain campaigns" on the image shown in FIG. 11 is displayed on the transparent screen 31. In this embodiment, the campaigns are commercial advertisements, and include, for example, giving a reward when a product is purchased for a predetermined amount or more. The campaigns also include giving a reward when a predetermined product is purchased in at least a predetermined number.

The payment processing unit 193 reads the product names, the prices, and so on from the product information 181 on the basis of the acquired product IDs. The payment processing unit 193 calculates the total amount for the products brought to the payment area in the basket 41. The payment processing unit 193 determines whether or not the calculated total amount exceeds the amount set for the campaign. When the total amount does not exceed the set amount, the payment processing unit 193 determines whether or not the shortfall is less than a preset small amount. When the shortfall is less than the preset small amount, the payment processing unit 193 refers to the product information 181 in order to search for a product having a suitable price for making up for the shortfall. Note that the payment processing unit 193 may search for the product by referring to the popularity of the products and the newness of the products. Moreover, the payment processing unit 193 may estimate the preferences of the customer from the purchase history of the customer and select a product that the customer is likely to choose. Alternatively, products that have a low unit price and are frequently purchased may be set in advance.

When the payment processing unit 193 finds a product that is suitable for making up for the shortfall, the display control unit 194 displays a message on the display device 30 indicating that simply by additionally purchasing a predetermined product, the set amount will be exceeded.

Figure 13:
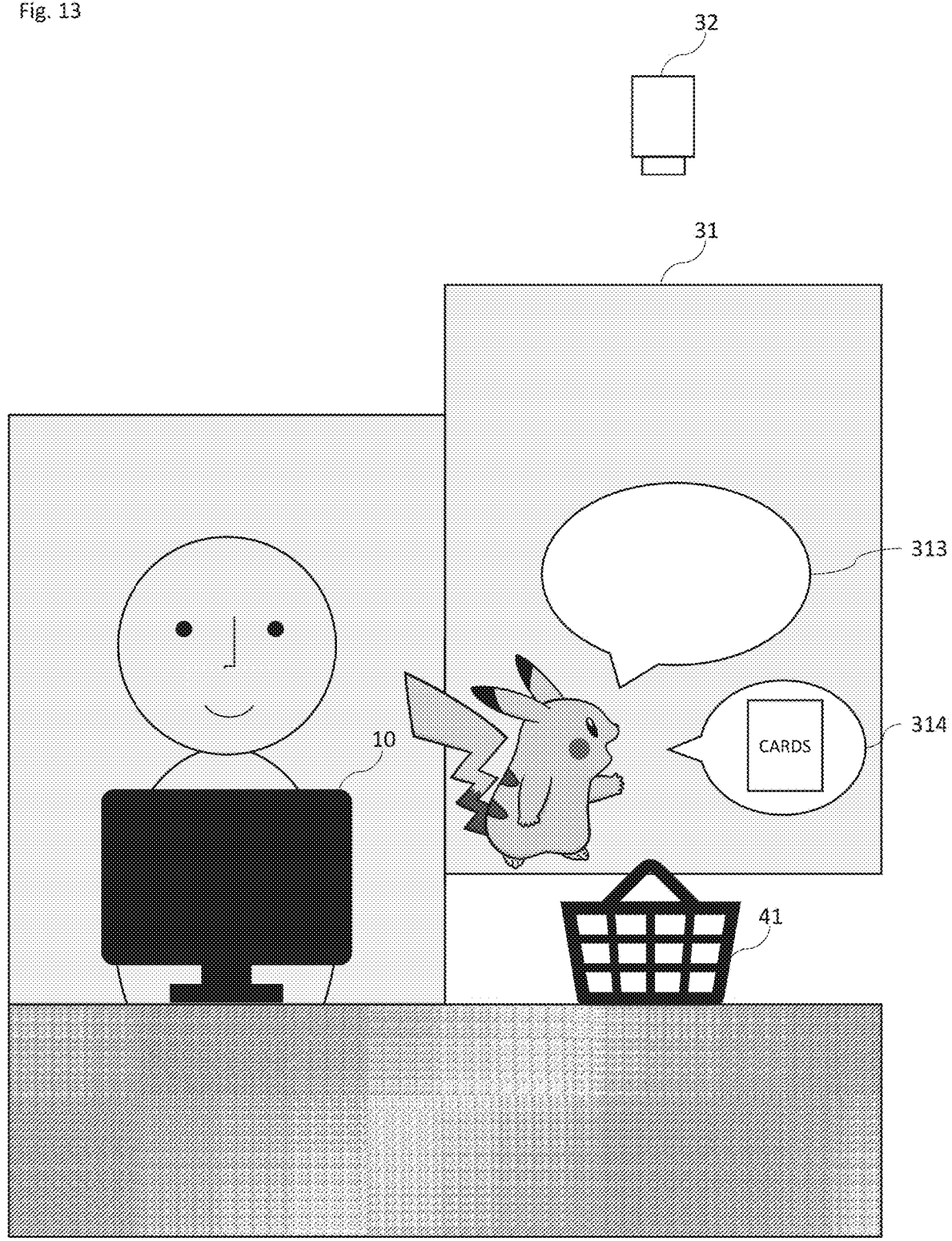
FIG. 13 is a diagram illustrating an image displayed on the transparent screen when confirming an additional purchase.

FIG. 13 is a diagram illustrating an example of an image displayed on the transparent screen 31 when checking for additional purchases. On the image shown in FIG. 13, the character indicates the shortfall from the set amount of the campaign in a comment area 313. Further, on the image shown in FIG. 13, the character indicates the product to be additionally purchased in a comment area 314. On the image shown in FIG. 13, for example, the character proposes a card pack as the product to be additionally purchased.

The customer considers whether or not to additionally purchase the proposed product, and when the product is to be purchased, the customer informs the salesperson thereof.

Having acquired the product IDs of all of the products in the basket 41, for example, the payment processing unit 193 checks whether a shopping bag is required and confirms the size of the required shopping bag. At this time, for example, an image of the instruction object 312 superimposed on "Shopping bag check" on the image shown in FIG. 11 is displayed on the transparent screen 31, whereupon a screen for confirming the shopping bag is displayed. In this embodiment, the shopping bag is a shopping bag with a store logo or a design printed thereon.

Figure 14:
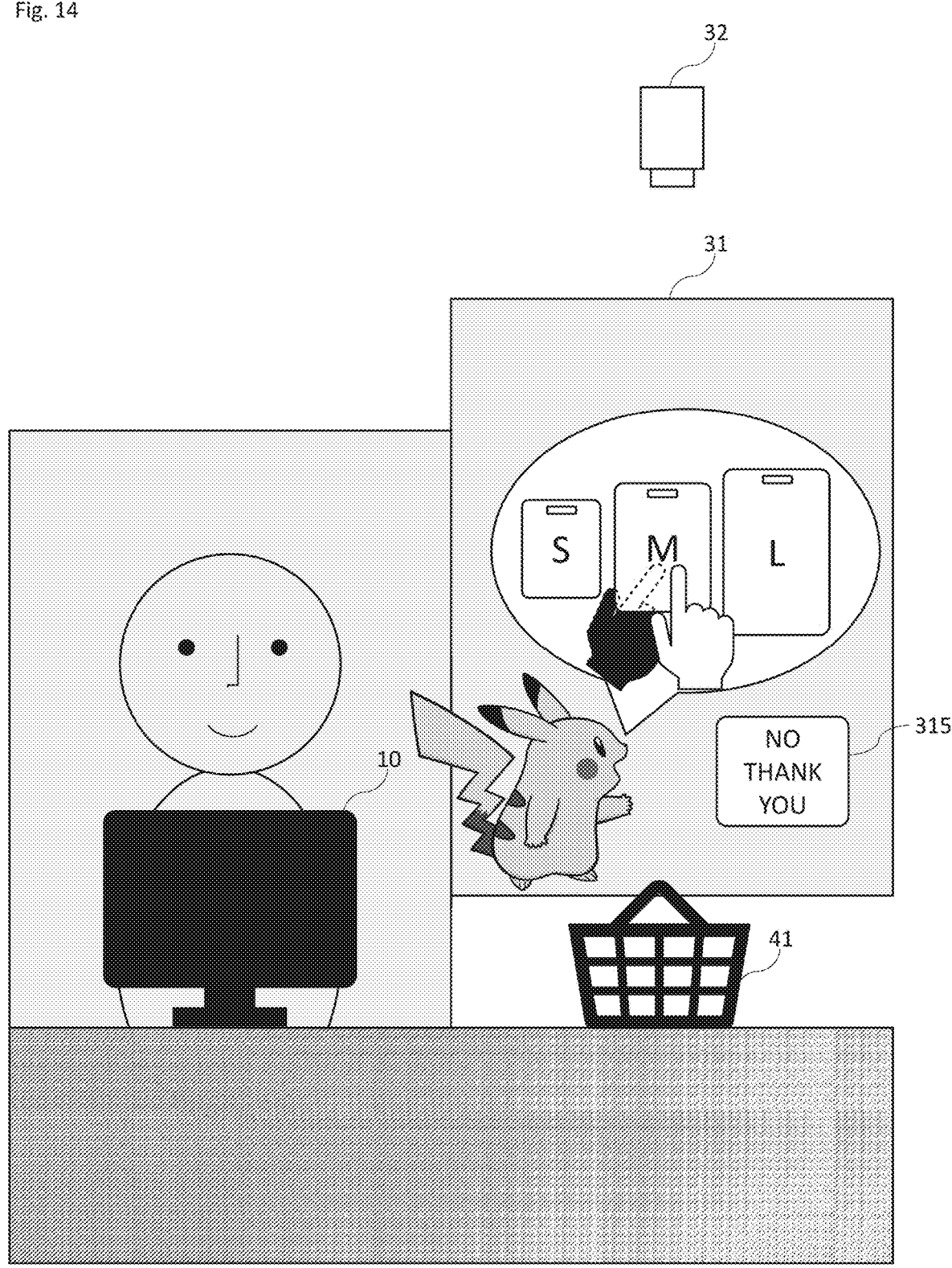
FIG. 14 is a diagram illustrating an image displayed on the transparent screen when checking for a shopping bag.

FIG. 14 is a diagram illustrating the image displayed on the transparent screen 31 when performing a shopping bag check. In FIG. 14, a plurality of types of shopping bags are displayed so as to be introduced by the character. An object 315 indicating that a shopping bag is not required is displayed on the transparent screen 31.

The customer informs the salesperson of whether or not a shopping bag is required and the desired shopping bag by means of a gesture instruction or a voice instruction.

When an intention is conveyed by means of a gesture instruction, the operation reception unit 191 receives input on the basis of imaging signals transmitted from the first camera 161 and the second camera 162, for example.

Figure 15:
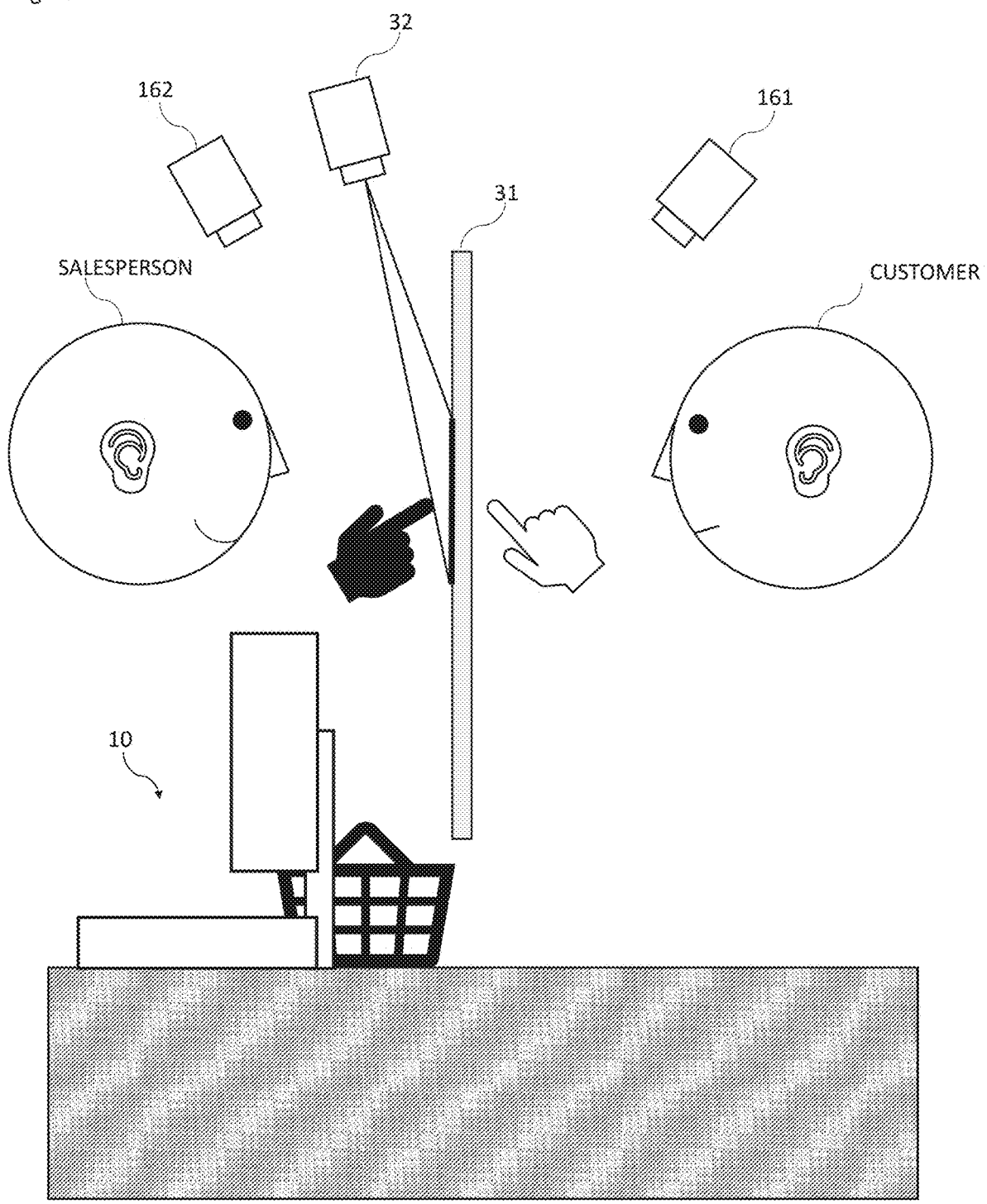
FIG. 15 is a diagram illustrating configurations of the POS terminal and a display device when an intention is conveyed by a gesture instruction.

FIG. 15 is a schematic view illustrating example configurations of the POS terminal 10 and the display device 30 when an intention is conveyed by a gesture instruction. An image projected from the projection device 32 is displayed on the transparent screen 31. The first camera 161 is disposed so as to capture an image of the transparent screen 31 from the customer side. The second camera 162 is disposed so as to capture an image of the transparent screen 31 from the salesperson side.

For example, when input from the customer is required, such as when selecting whether or not a shopping bag is required or when selecting the type of shopping bag, the customer brings a finger close to the area displaying the desired option. For example, in the example of FIG. 14, the customer brings a finger close to the area displaying an M-sized shopping bag. In response to the action of the customer, the salesperson brings a finger close to the same area as the area pointed at by the customer. Note that there is no need to touch the transparent screen 31.

When the customer and the salesperson bring their fingers close to the same area, for example, the operation reception unit 191 determines that the option displayed in the area has been selected. In the example of FIG. 14, when the customer specifies the M-sized shopping bag (the white pointing finger) and the salesperson specifies the M-sized shopping bag on the opposite side (the black pointing finger), the operation reception unit 191 determines that the M-sized shopping bag has been selected. Further, when the customer specifies the "No thank you" object 315 and the salesperson specifies the "No thank you" object 315 on the opposite side, the operation reception unit 191 determines that a shopping bag is not required.

Note that selection of an option displayed on the transparent screen 31 is not limited to the above principle. The operation reception unit 191 may determine a selection on the basis of solely the pointing finger of the customer or may determine a selection on the basis of solely the pointing finger of the salesperson. Note that as long as it is possible to confirm the operation, confirmation is not limited to finger pointing, and specification using the palm of the hand, for example, may be performed instead.

When an intention is conveyed by means of a voice instruction, the operation reception unit 191 determines that a selection has been made on the basis of a voice utterance by the customer and a confirmation voice utterance by the salesperson, for example. In the example of FIG. 14, when the customer says "An M-sized shopping bag" and the salesperson confirms this by saying "An M-sized shopping bag, yes?", the operation reception unit 191 determines that the M-sized shopping bag has been selected.

Note that selection of an option displayed on the transparent screen 31 is not limited to the above principle. The operation reception unit 191 may determine a selection on the basis of solely a voice utterance by the customer or may determine a selection on the basis of solely a voice utterance by the salesperson.

After confirming the shopping bag, the payment processing unit 193 confirms the payment method, for example. At this time, for example, an image of the instruction object 312 superimposed on "Payment method" on the image shown in FIG. 11 is displayed on the transparent screen 31, whereupon a screen confirming the payment method is displayed.

Figure 16:
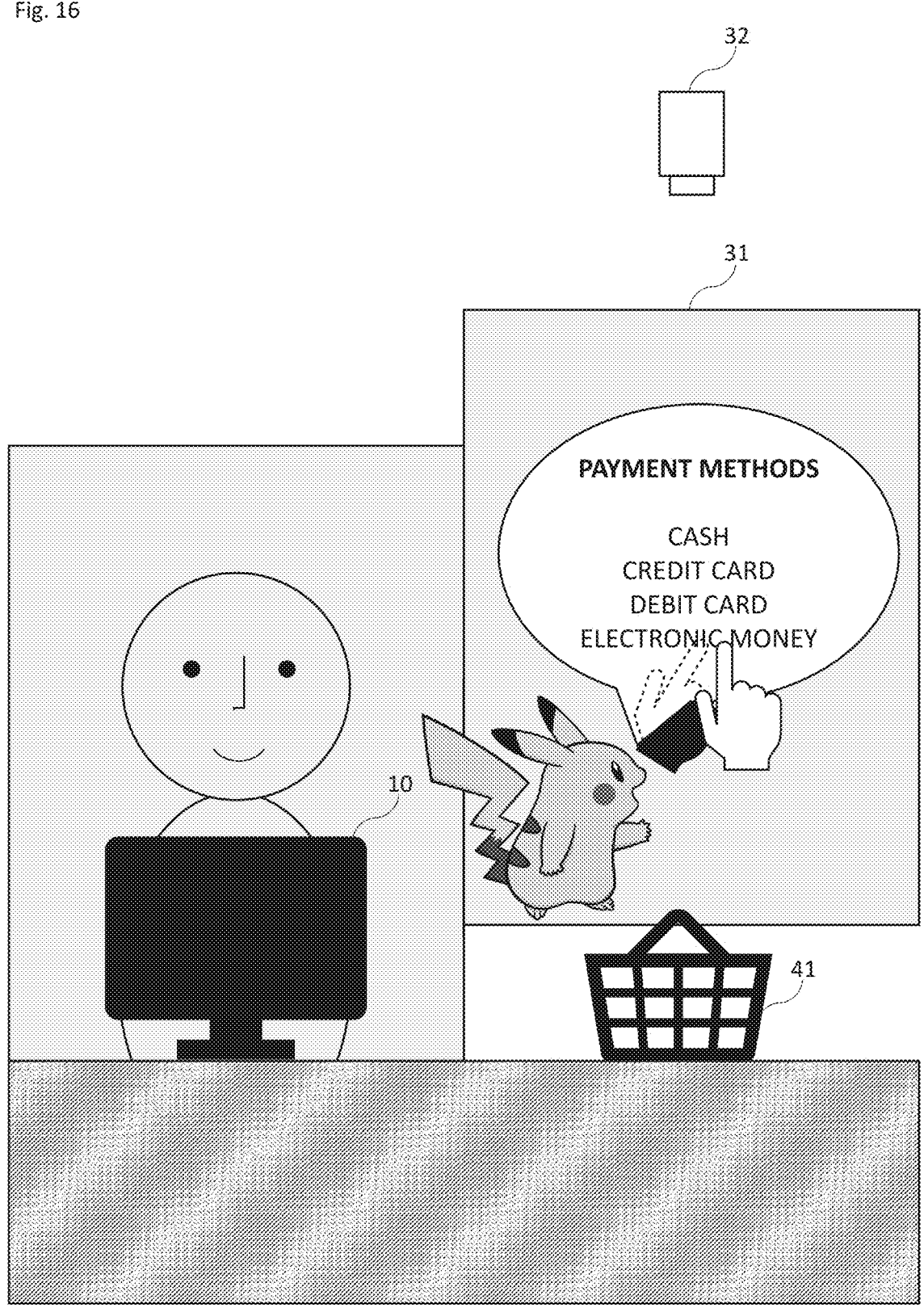
FIG. 16 is a diagram illustrating an image displayed on the transparent screen when confirming a payment method.

FIG. 16 is a diagram illustrating the image displayed on the transparent screen 31 when confirming the payment method. In FIG. 16, a plurality of types of payment methods are displayed so as to be introduced by the character. In FIG. 16, "Cash", "Credit card", "Debit card", and "Electronic money" are displayed as payment method options.

The customer informs the salesperson of the payment method by means of a gesture instruction or a voice instruction.

When an intention is conveyed by means of a gesture instruction, the operation reception unit 191 receives input on the basis of imaging signals transmitted from the first camera 161 and the second camera 162, for example. In the example of FIG. 16, for example, the customer brings a finger close to the area displaying electronic money. In response to the action of the customer, the salesperson brings a finger close to the same area as the area pointed at by the customer. Note that there is no need to touch the transparent screen 31. When the customer specifies electronic money (the white pointing finger) and the salesperson specifies electronic money on the opposite side (the black pointing finger), the operation reception unit 191 determines that electronic money has been selected.

When an intention is conveyed by means of a voice instruction, the operation reception unit 191 determines that a selection has been made on the basis of a voice utterance by the customer and a confirmation voice utterance by the salesperson, for example. In the example of FIG. 16, when the customer says "Electronic money" and the salesperson confirms this by saying "Electronic money, yes?", the operation reception unit 191 determines that electronic money has been selected.

In the example described above, "Cash", "Credit card", "Debit card", and "Electronic money" are included as the payment method options in FIG. 16, but the payment method options are not limited thereto. The payment method options may also include the type of credit card, the type of electronic money, and so on.

The payment processing unit 193 executes payment processing using the selected payment method. At this time, for example, an image of the instruction object 312 superimposed on "Payment" on the image shown in FIG. 11 is displayed on the transparent screen 31. After completing payment using the selected payment method, for example, the payment processing unit 193 checks for a parking ticket.

Figure 17:
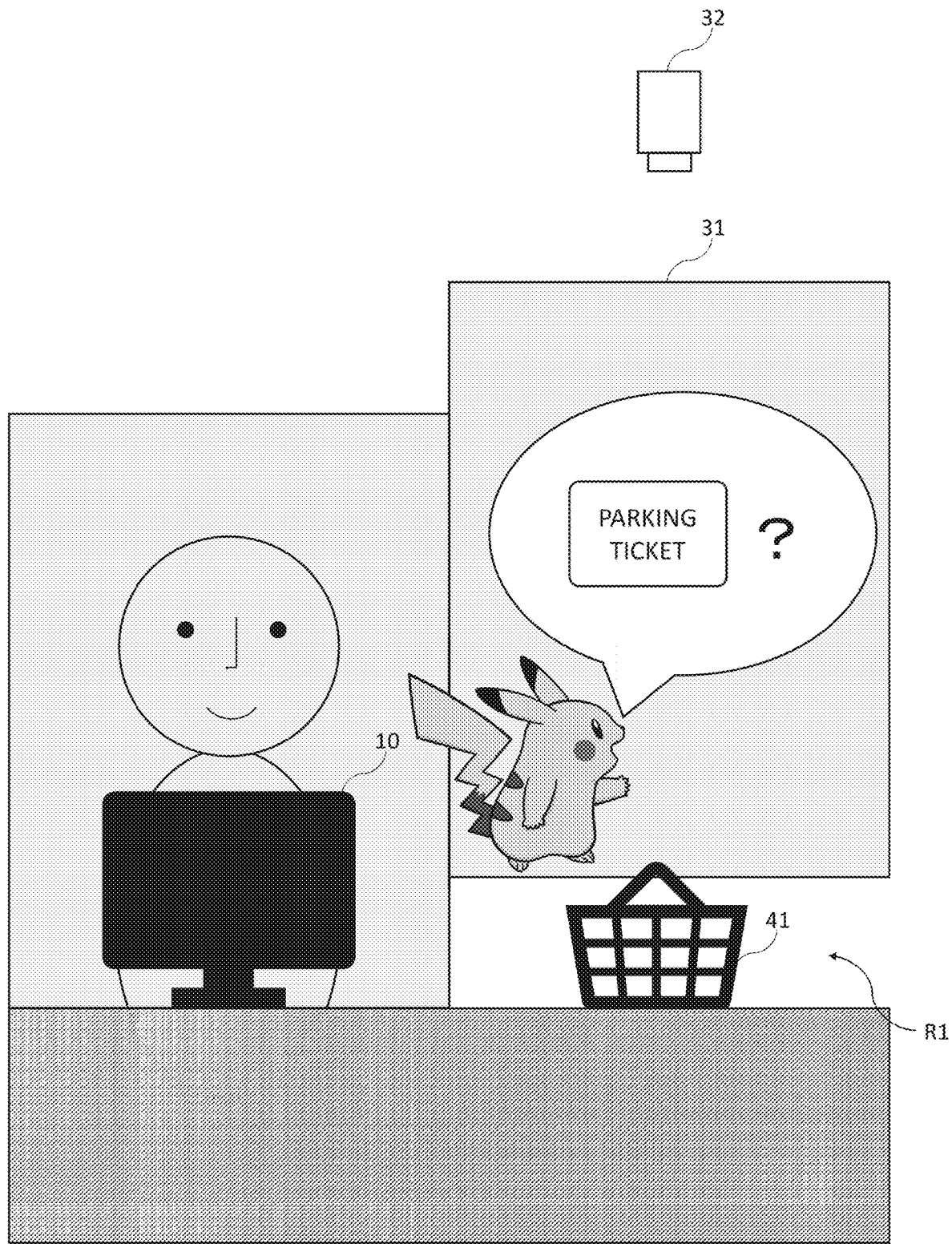
FIG. 17 is a diagram illustrating an image displayed on the transparent screen when checking for a parking ticket.

FIG. 17 is a diagram illustrating an example of an image displayed on the transparent screen 31 when checking for a parking ticket. In FIG. 17, the character is displayed as checking whether or not the customer has a parking ticket. When the customer has a parking ticket, the customer passes the parking ticket to the salesperson through the space R1. The salesperson asks the customer whether or not they have a parking ticket after the payment processing is complete, and as a result, the customer may fail to hear the salesperson. By having the character check for a parking ticket visually, the customer can avoid failing to hear, and as a result, the stress involved in having to ask back can be reduced.

After completing the payment processing, the salesperson hands the products purchased by the customer over to the customer. At this time, for example, an image of the instruction object 312 superimposed on "Hand over" on the image shown in FIG. 11 is displayed on the transparent screen 31. Once the products have been handed over to the customer, the display control unit 194 displays an image taking leave of the customer on the display device 30. The image taking leave of the customer is a substantially identical image to the image shown in FIG. 9, for example. Note, however, that a comment expressing gratitude, such as "Thank you very much", a comment expressing hope for a return visit, such as "Please come again", and so on are displayed in the comment area 311. The displayed character is a favorite character, a character specified when booking the store visit, a character set in relation to the salesperson, a preset character, or the like, for example.

After receiving the products, the customer moves away from the POS terminal 10 while taking leave of the character displayed on the transparent screen 31. Once the customer has moved away from the POS terminal 10, the POS terminal 10 can receive the next customer.

In response to an operation performed by the salesperson, for example, the display control unit 194 displays an image indicating that preparation for receiving the next customer is complete on the display device 30. Note that the display control unit 194 may display the image indicating that preparation for receiving the next customer is complete on the display device 30 automatically in response to the customer moving away from the POS terminal 10 or in response to completion of the payment processing.

Figure 18:
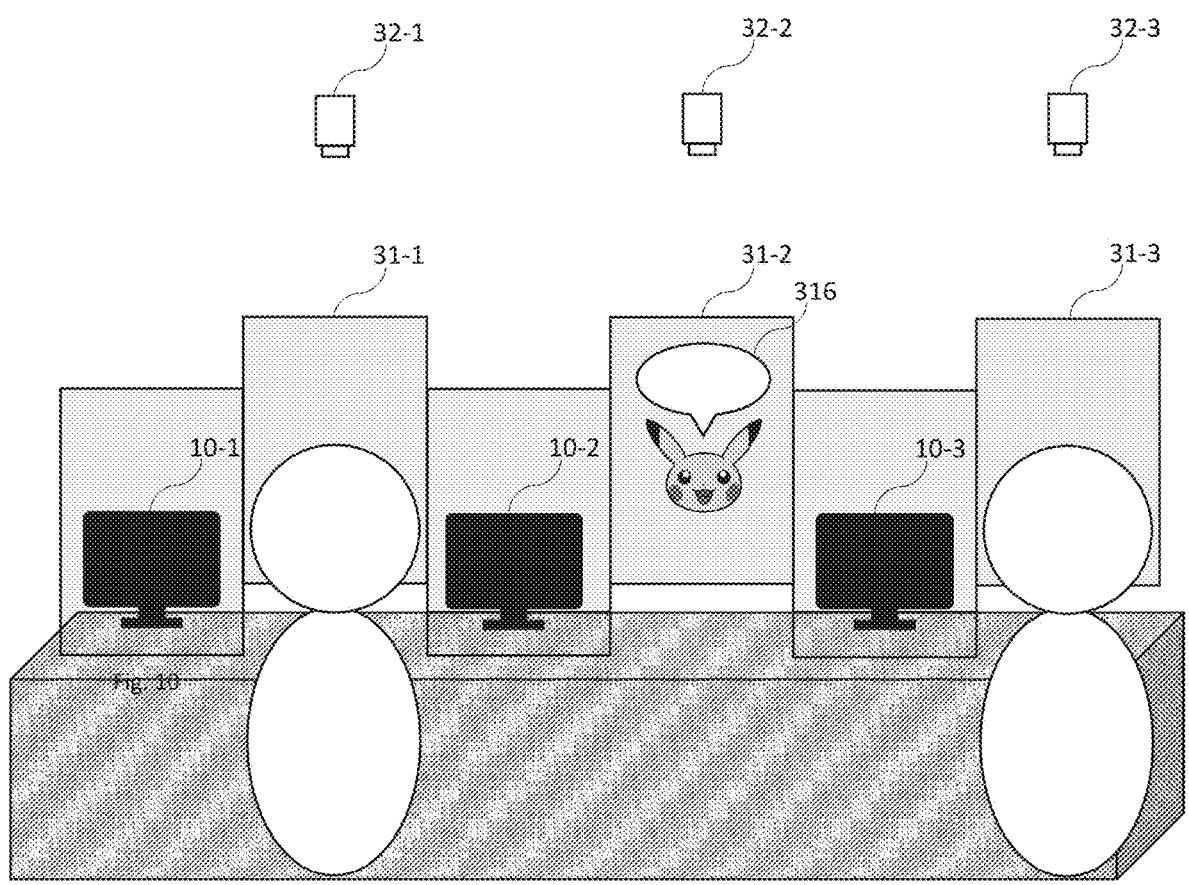
FIG. 18 is a diagram illustrating an image displayed on the transparent screen when preparation for receiving the next customer is complete.

FIG. 18 is a diagram illustrating an example of an image displayed on the transparent screen 31 when preparation for receiving the next customer is complete. In FIG. 18, a character indicating that payment processing on a central POS terminal 10-2 is complete and therefore the POS terminal 10-2 is available is displayed on a transparent screen 31-2 together with a comment area 316. A comment indicating that the corresponding POS terminal 10-2 is available is displayed in the comment area 316.

The size of the image displayed on the transparent screen 31 when the POS terminal 10 is available may differ depending on the position of the transparent screen 31. For example, a small image may be displayed on the transparent screen 31 that is close to the line of customers waiting to perform payment processing, and steadily larger images may be displayed on transparent screens 31 further from the line.

Figure 19:
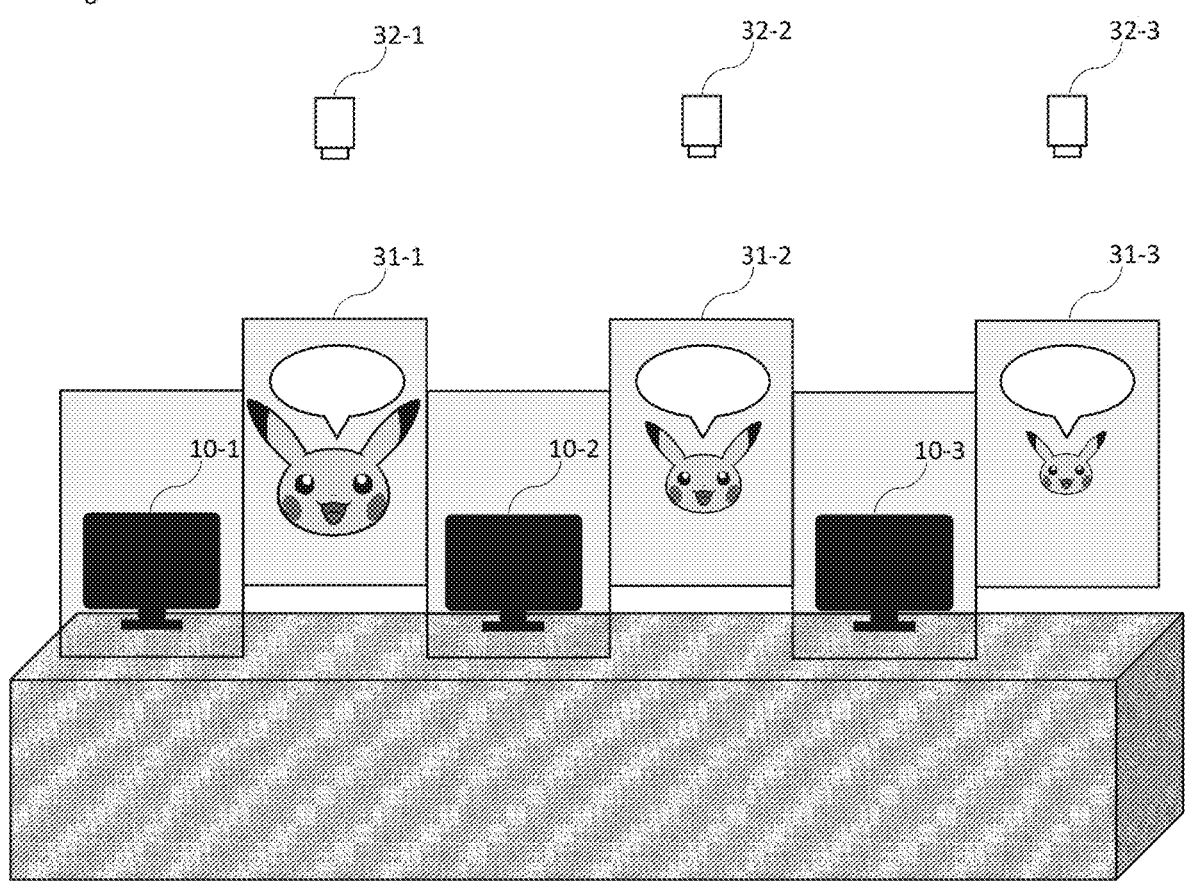
FIG. 19 is a diagram illustrating the size of a display image.

FIG. 19 is a schematic view illustrating an example of the sizes of the displayed images. In FIG. 19, it is assumed that a transparent screen 31-3 is close to the line and a transparent screen 31-1 is far from the line. In this case, the image displayed on the transparent screen 31-1 is larger than the image displayed on the transparent screen 31-3. In an environment where a sheet separating the customer from the salesperson is not provided, salespeople using more distant POS terminals lean further over the cash register counter and call out to the customers in a louder voice. In an environment where the transparent screen 31 separating the customer from the salesperson is provided, however, it is difficult to lean over the cash register counter and difficult for a voice to pass through the transparent screen 31. Therefore, the size of the image displayed on each transparent screen 31 can be modified so that the images displayed on the transparent screens 31 that are further away from the line steadily increase in size. Thus, the images can easily be seen by customers standing further away.

In this embodiment, as described above, the POS terminal 10 uses the operation reception unit 191 to receive input relating to payment for a product from the salesperson. The display control unit 194 then displays an image of an effect corresponding to the payment-related input on the transparent screen 31 disposed so as to separate the salesperson from the customer who is purchasing the product. Thus, the POS terminal 10 can provide the customer with enjoyment during payment. Moreover, since a physically identical image is displayed ahead of the lines of sight of the customer and the salesperson, the customer and the salesperson communicate actively. Hence, the POS terminal 10 can use a transparent shield, which previously merely separated the salesperson from the customer, as a tool for enriching the shopping experience.

Further, in the above embodiment, the operation reception unit 191 receives instructions relating to the transparent screen 31 from the salesperson. The display control unit 194 then controls the display on the transparent screen 31 in accordance with the received instruction. As a result of the images displayed on the transparent screen 31, the customer and the salesperson communicate actively. Although the transparent screen 31 is effective as a tool for enriching the shopping experience, at crowded times it may be desirable to perform the payment processing quickly. Even in such cases, it is possible to ensure that high-entertainment value images are not displayed on the transparent screen 31 without switching off the power supply of the display device 30. Thus, the POS terminal 10 can control the display device 30 appropriately in accordance with the congestion condition.

Furthermore, in the above embodiment, the display control unit 194 acquires personal information about the customer. The display control unit 194 then displays an image of a character associated with the acquired personal information on the transparent screen 31. Thus, the POS terminal 10 can improve the degree of satisfaction of the customer during payment.

Moreover, in the above embodiment, the personal information of the customer includes information relating to a favorite character of the customer, information relating to an event (the birthday or the like, for example) of the customer, or information relating to a character specified when booking the store visit. Thus, the POS terminal 10 can display images that are unique to the customer on the transparent screen 31, and as a result, the degree of satisfaction of the customer during payment can be further improved.

Furthermore, in the above embodiment, the display control unit 194 displays an image set for the POS terminal 10 executing payment for the product or an image set for the salesperson on the transparent screen 31. Thus, the image displayed on the transparent screen 31 changes for each POS terminal 10 or each salesperson, thereby increasing the enjoyment of the store visit.

Moreover, in the above embodiment, the operation reception unit 191 receives input of the identification information of the product. The display control unit 194 displays an image relating to the input identification information on the transparent screen 31. Thus, the POS terminal 10 displays an image corresponding to the purchased product on the transparent screen 31, and as a result, the customer can enjoy buying various products.

Furthermore, in the above embodiment, when the product is a character product, the display control unit 194 displays an image of the character associated with the character product on the transparent screen 31 during purchase of the character product. Thus, the POS terminal 10 can provide enjoyment even in relation to the image displayed during purchase.

Moreover, in the above embodiment, the payment processing unit 193 determines whether or not the total amount for the purchased products is slightly below a predetermined amount. When the total amount is slightly below the predetermined amount, the display control unit 194 displays an image indicating that the total amount is slightly below the predetermined amount on the transparent screen 31. Thus, the customer can be made aware that the purchase amount is slightly short of an amount relating to a campaign.

Furthermore, in the above embodiment, when the purchase amount is slightly below the predetermined amount, the display control unit 194 displays an image introducing a product with which the predetermined amount is reached on the transparent screen 31. As a result, a proposal of an additional purchase is more likely to be accepted by the customer.

Moreover, in the above embodiment, the operation reception unit 191 receives an operation performed by the salesperson as an instruction. Thus, the POS terminal 10 can receive an instruction without receiving contact from the salesperson.

Furthermore, in the above embodiment, the operation reception unit 191 receives a voice issued by the salesperson as an instruction. Thus, the POS terminal 10 can receive an instruction without receiving contact from the salesperson.

Moreover, in the above embodiment, the display control unit 194 displays an image by interlinking a plurality of transparent screens 31 disposed in relation to a plurality of POS terminals 10. Thus, the customer can view a more striking image, and as a result, the shopping experience is enhanced.

Furthermore, in the above embodiment, the display control unit 194 displays an image by interlinking the transparent screens 31 disposed in relation to other, idle POS terminals 10. Thus, the POS terminal 10 can provide the customer with a more striking image when the store is empty.

Moreover, in the above embodiment, the display control unit 194 displays images on the transparent screen 31 disposed so as to separate the salesperson from the customer. The operation reception unit 191 receives instructions from the salesperson in relation to the transparent screen 31. The display control unit 194 controls the display on the transparent screen 31 in accordance with the instructions. Thus, the POS terminal 10 can control the display device 30 appropriately at crowded times.

Hence, with the POS terminal 10 according to the embodiment described above, the customer can be provided with a superior shopping experience while realizing hygiene management.

MODIFICATION EXAMPLES

In the above embodiment, a case in which images are displayed on one display device 30 for each customer was described as an example. However, images may be displayed using a plurality of display devices 30 for each customer. For example, when the adjacent POS terminal 10 is available, the display device 30 provided in relation to the available POS terminal 10 may also be used to display images.

For example, the display control unit 194 is configured to be capable of controlling a plurality of display devices 30. When the adjacent POS terminal 10 is available, for example, the salesperson operates the input device 13 so as to make the display device 30 disposed in relation to the available POS terminal 10 controllable from the POS terminal 10 operated by the salesperson. The display control unit 194 displays the guidance display described above in a more striking manner using a plurality of display devices 30.

Figure 20:
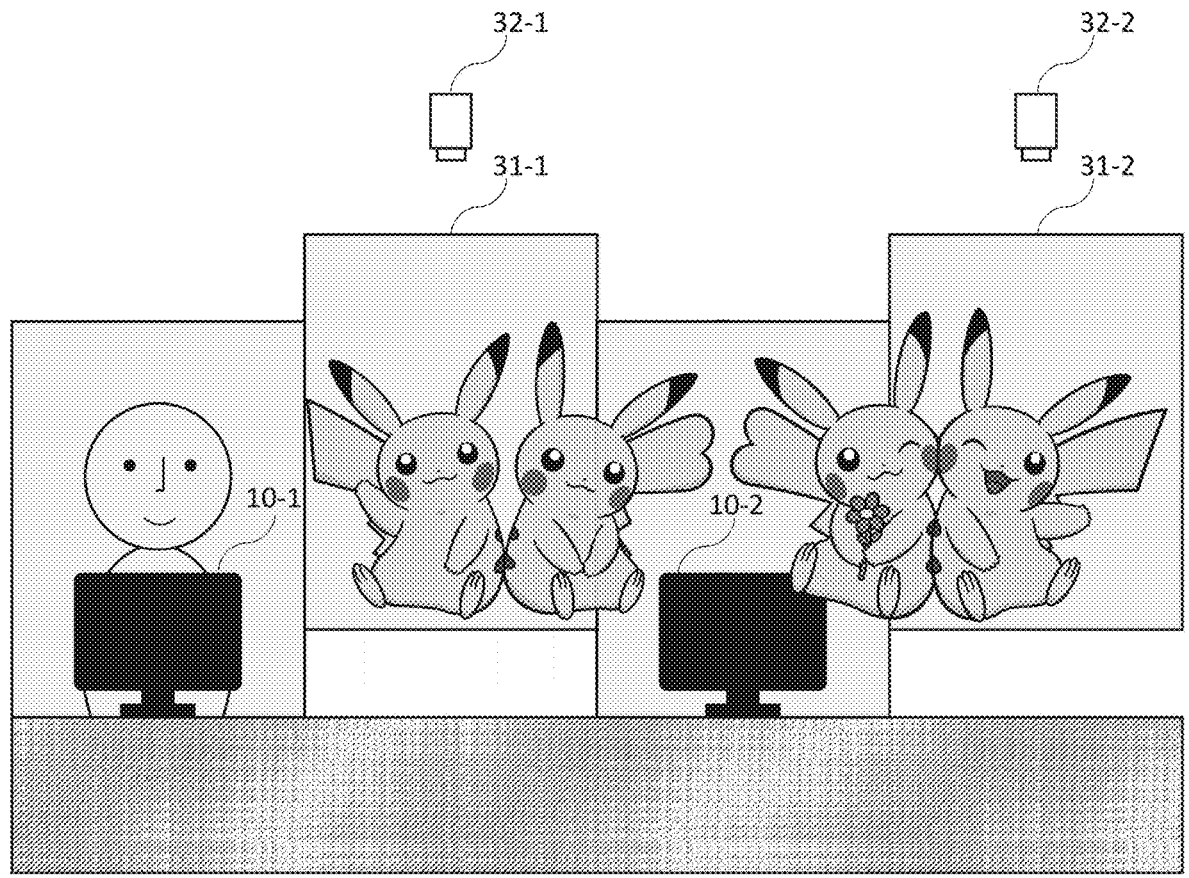
FIG. 20 is a diagram illustrating an image displayed using two display devices.

FIG. 20 is a diagram illustrating an example of an image displayed using two display devices 30. In FIG. 20, the POS terminal 10-2 is available, and therefore the image relating to the customer who is executing payment processing at the POS terminal 10-1 is displayed on both the transparent screen 31-1 and the transparent screen 31-2. In FIG. 20, only characters are displayed, but various types of guidance display may be displayed together with the characters. Further, in FIG. 20, four characters are displayed, but the number of displayed characters is not limited to four, and instead, one large character or five or more characters may be displayed.

Furthermore, images may be displayed on a plurality of display devices 30 likewise when calling a customer to an available POS terminal 10. The display control unit 194 displays a guidance image on the available POS terminal 10 in a more striking manner using a plurality of display devices 30.

Figure 21:
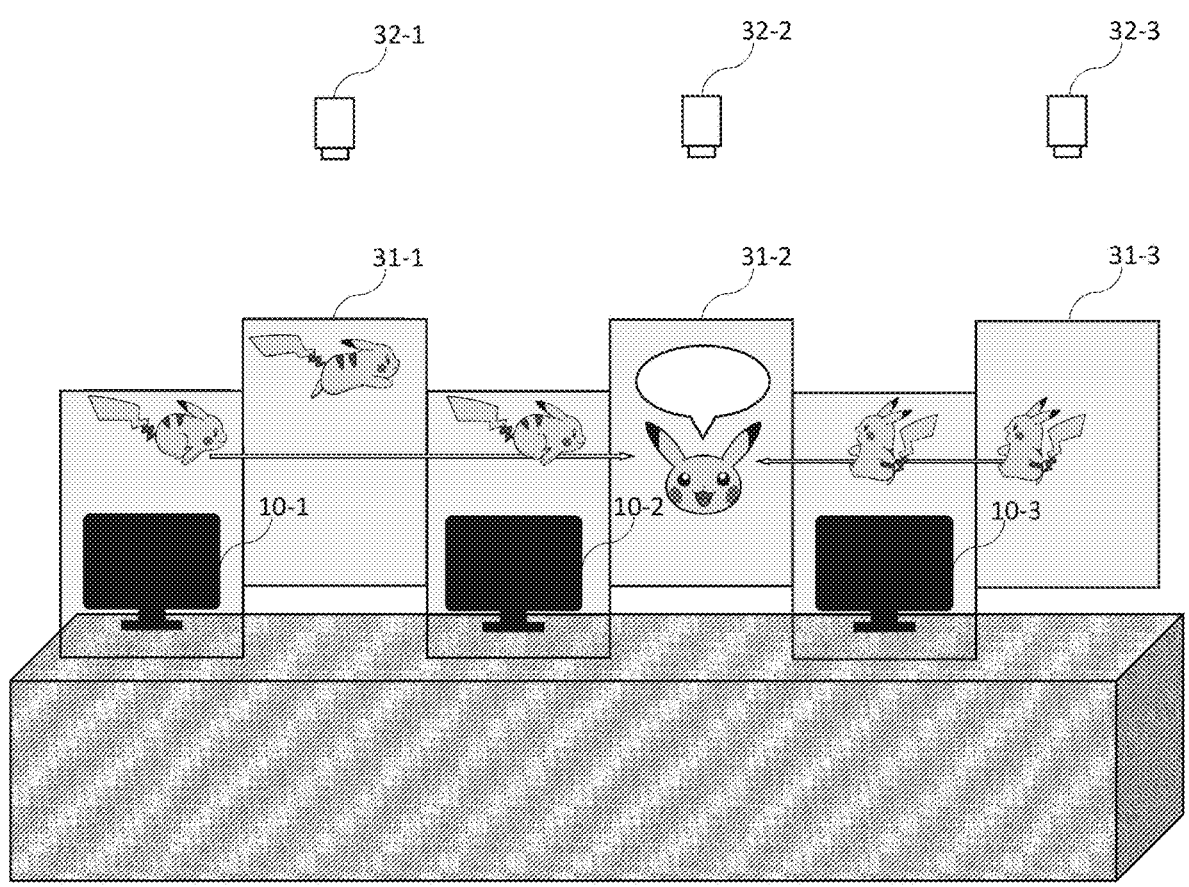
FIG. 21 is a diagram illustrating an image displayed on the transparent screen when preparation for receiving the next customer is complete.

FIG. 21 is a diagram illustrating an example of an image displayed on the transparent screens 31 when preparation for receiving the next customer is complete. In FIG. 21, images are also displayed on the transparent screen 31-1 and the transparent screen 31-3 in order to indicate that the transparent screen 31-2 is available.

Furthermore, in the above embodiment, a case in which images are displayed on the display device 30 in conjunction with the process relating to the payment processing was described as an example. However, the display control unit 194 may display images on the display device 30 in conjunction with an element other than the process relating to the payment processing. For example, the display control unit 194 may display images on the display device 30 in conjunction with an event in the store. Events in the store include character greeting events, game competitions, and so on, for example. The images displayed on the display device 30 include images of a character associated with the event, a product associated with the event, information relating to the event, and so on, for example.

Images linked to the event may be displayed respectively on the display devices 30 or displayed by a plurality of interlinked display devices 30.

Although some embodiments of the present disclosure have been described above, these embodiments can be implemented in various other forms, and modifications can be made without departing from the scope and spirit of the disclosure. It is to be understood that such embodiments and modifications thereof are included in the scope and spirit of the disclosure and are also included in the disclosure as set forth in the claims as well as equivalents thereof.

SUPPLEMENTS

The matters described in the respective embodiments will be supplemented hereinafter.
(Supplement 1)
A program for causing a computer having a processor 19 and a memory 15 to execute a step (step S11 and step S16) for receiving input relating to payment for a product from a first party, and a step (step S14 and step S17) for displaying an image of an effect corresponding to the input relating to payment on a transparent display medium (the transparent screen 31) disposed so as to separate the first party from a second party who is purchasing the product.

(Supplement 2)

The program described in (Supplement 1), wherein the processor is caused to execute a step (191) for receiving an instruction relating to the display medium from the first party, and a step (194) for controlling the display on the display medium in accordance with the instruction.

(Supplement 3)

The program described in (Supplement 1) or (Supplement 2), wherein the processor is caused to execute a step (step S13) for acquiring personal information about the second party, and in the step for displaying an image on the display medium, an image of a character associated with the acquired personal information is displayed on the display medium.

(Supplement 4)

The program described in (Supplement 3), wherein the personal information about the second party includes information relating to a favorite character of the second party, information relating to an event of the second party, or information relating to a character specified when booking a store visit.

(Supplement 5)

The program described in (Supplement 1) or (Supplement 2), wherein, in the step for displaying an image on the display medium, an image an image set for a POS terminal used to execute payment for the product or an image set for the first party is displayed on the display medium.

(Supplement 6)

The program described in any of (Supplement 1) to (Supplement 5), wherein, in the step for receiving input, input of identification information identifying the product is received, and in the step for displaying an image on the display medium, an image associated with the input identification information is displayed on the display medium.

(Supplement 7)

The program described in (Supplement 6), wherein, when the product is a character product, an image of the character associated with the character product is displayed on the display medium in the step for displaying an image on the display medium.

(Supplement 8)

The program described in (Supplement 6), wherein the processor is caused to execute a step (step S17) for determining whether or not a total amount for the products for which input of the identification information has been received is slightly below a predetermined amount, and when the total amount is slightly below the predetermined amount, an image indicating that the total amount is slightly below the predetermined amount is displayed on the display medium in the step for displaying an image on the display medium.

(Supplement 9)

The program described in (Supplement 8), wherein, when the total amount is slightly below the predetermined amount, an image introducing a product with which the predetermined amount is reached is displayed on the display medium in the step for displaying an image on the display medium.

(Supplement 10)

The program described in (Supplement 2), wherein, in the step for receiving an instruction, an operation performed by the first party is received as the instruction.

(Supplement 11)

The program described in (Supplement 2), wherein, in the step for receiving an instruction, a voice issued by the first party is received as the instruction.

(Supplement 12)

The program described in any of (Supplement 1) to (Supplement 11), wherein, in the step for displaying an image on the display medium, an image is displayed by interlinking a plurality of display media disposed in relation to a plurality of POS terminals.

(Supplement 13)

The program described in (Supplement 12), wherein, in the step for displaying an image on the display medium, an image is displayed by interlinking display media disposed in relation to idle POS terminals.

(Supplement 14)

A program for causing a computer having a processor 19 and a memory 15 to execute a step for displaying an image on a transparent display medium disposed so as to separate a first party who performs payment processing for a product from a second party who is purchasing the product, a step for receiving an instruction in relation to the display medium from the first party, and a step for controlling the display on the display medium in accordance with the instruction.

(Supplement 15)

A method executed by a computer having a processor 19 and a memory 15, wherein the processor executes a step for receiving input relating to payment for a product from a first party, and a step for displaying an image of an effect corresponding to the input relating to payment on a transparent display medium disposed so as to separate the first party from a second party who is purchasing the product.

(Supplement 16)

An information processing device 10 having a control unit 190 and a storage unit 180, wherein the control unit 190 executes a step for receiving input relating to payment for a product from a first party, and a step for displaying an image of an effect corresponding to the input relating to payment on a transparent display medium disposed so as to separate the first party from a second party who is purchasing the product.

(Supplement 17)

A system comprising means (10) for receiving input relating to payment for a product from a first party, and means (30) for displaying an image of an effect corresponding to the input relating to payment on a transparent display medium disposed so as to separate the first party from a second party who is purchasing the product.

The invention claimed is:

1. A non-transitory computer-readable storage program storing computer readable instructions thereon which, when executed by a computer, cause the computer to perform a method, the method comprising:
   receiving identification information identifying the product;
   receiving, from a first party, input relating to payment for a product;
   displaying an image of an effect corresponding to the input relating to payment on a transparent display medium disposed so as to separate the first party from a second party who is purchasing the product, wherein the transparent display medium is a transparent material such that the first party and the second party can recognize each other's faces through the transparent display medium, wherein the image of the effect corresponds to the shopping experience of the second party during payment;
   determining whether or not a total amount for the products for which input of the identification information has been received is below a predetermined amount, and in a case that the total amount is below the predetermined amount, displaying an image on the transparent display medium indicating that the total amount is below the predetermined amount, and displaying an image on the transparent display medium introducing a product with which the predetermined amount is reached; and controlling communication between a point of sale (POS) terminal and a display device that includes the transparent display medium and a projection device, wherein the projection device projects the images onto the transparent display medium based on control from the POS terminal, and wherein the projection device is disposed in a position where light projected by the projection device is not emitted onto the first party or the second party.

2. The non-transitory computer-readable storage program according to claim 1, further comprising:

receiving an instruction relating to the display medium from the first party; and controlling the display on the display medium in accordance with the instruction.

3. The non-transitory computer-readable storage program according to claim 2, further comprising:

acquiring personal information about the second party, and wherein displaying an image on the display medium includes displaying on the display medium an image of a character associated with the acquired personal information.

4. The non-transitory computer-readable storage program according to claim 3, wherein the personal information about the second party includes one or more of information relating to a favorite character of the second party, information relating to an event of the second party, and information relating to a character specified when booking a store visit.

5. The non-transitory computer-readable storage program according to claim 1, wherein displaying an image on the display medium includes displaying on the display medium an image set for the POS terminal used to execute payment for the product or an image set for the first party.

6. The non-transitory computer-readable storage program according to claim 5, wherein displaying an image on the display medium includes displaying on the display medium an image associated with the input identification information.

7. The non-transitory computer-readable storage program according to claim 6, wherein, when the product is a character product, an image of the character associated with the character product is displayed on the display medium.

8. The non-transitory computer-readable storage program according to claim 2, wherein receiving an instruction includes receiving an operation performed by the first party as the instruction.

9. The non-transitory computer-readable storage program according to claim 2, wherein receiving an instruction includes receiving a voice issued by the first party as the instruction.

10. The non-transitory computer-readable storage program according to claim 9, wherein displaying an image on the display medium includes displaying on the display medium an image by interlinking a plurality of display media disposed in relation to a plurality of POS terminals.

11. The non-transitory computer-readable storage program according to claim 10, wherein displaying an image on the display medium includes displaying on the display medium an image by interlinking display media disposed in relation to idle POS terminals.

12. A non-transitory computer-readable storage program storing computer-readable instructions thereon which, when executed by a computer, cause the computer to perform a method, the method comprising:

displaying an image on a transparent display medium disposed so as to separate a first party who performs payment processing for a product from a second party who is purchasing the product, wherein the transparent display medium is a transparent material such that the first party and the second party can recognize each other's faces through the transparent display medium, wherein the image corresponds to the shopping experience of the second party during payment;

determining whether or not a total amount for the product for which input of identification information has been received is below a predetermined amount, and in a case that the total amount is below the predetermined amount, displaying an image on the transparent display medium indicating that the total amount is below the predetermined amount, and displaying an image on the transparent display medium introducing a product with which the predetermined amount is reached;

controlling communication between a point of sale (POS) terminal and a display device that includes the transparent display medium and a projection device, wherein the projection device projects the images onto the transparent display medium based on control from the POS terminal, and wherein the projection device is disposed in a position where light projected by the projection device is not emitted onto the first party or the second party;

receiving an instruction in relation to the display medium from the first party; and controlling the display on the display medium in accordance with the instruction.

13. A method, comprising:

receiving, by processing circuitry, identification information identifying the product;

receiving, from a first party, input relating to payment for a product;

displaying, by the processing circuitry, an image of an effect corresponding to the input relating to payment on a transparent display medium disposed so as to separate the first party from a second party who is purchasing the product, wherein the transparent display medium is a transparent material such that the first party and the second party can recognize each other's faces through the transparent display medium, wherein the image of the effect corresponds to the shopping experience of the second party during payment;

determining whether or not a total amount for the products for which input of the identification information has been received is below a predetermined amount, and in a case that the total amount is below the predetermined amount, displaying an image on the transparent display medium indicating that the total amount is below the predetermined amount, and displaying an image on the transparent display medium introducing a product with which the predetermined amount is reached; and controlling communication between a point of sale (POS) terminal and a display device that includes the transparent display medium and a projection device, wherein the projection device projects the images onto the transparent display medium based on control from the POS terminal, and wherein the projection device is disposed in a position where light projected by the projection device is not emitted onto the first party or the second party.

14. An information processing device having a processor and a memory, wherein the processor is configured to:
receive identification information identifying the product,
receive, from a first party, input relating to payment for a product;
display an image of an effect corresponding to the input relating to payment on a transparent display medium disposed so as to separate the first party from a second party who is purchasing the product, wherein the transparent display medium is a transparent material such that the first party and the second party can recognize each other's faces through the transparent display medium, wherein the image of the effect corresponds to the shopping experience of the second party during payment;
determining whether or not a total amount for the products for which input of the identification information has been received is below a predetermined amount, and in a case that the total amount is below the predetermined amount, displaying an image on the transparent display medium indicating that the total amount is below the predetermined amount, and displaying an image on the transparent display medium introducing a product with which the predetermined amount is reached; and
controlling communication between a point of sale (POS) terminal and a display device that includes the transparent display medium and a projection device, wherein the projection device projects the images onto the transparent display medium based on control from the POS terminal, and wherein the projection device is disposed in a position where light projected by the projection device is not emitted onto the first party or the second party.

15. A system, comprising:
means for receiving identification information identifying the product;
means for receiving, from a first party, input relating to payment for a product;
means for displaying an image of an effect corresponding to the input relating to payment on a transparent display medium disposed so as to separate the first party from a second party who is purchasing the product, wherein the transparent display medium is a transparent material such that the first party and the second party can recognize each other's faces through the transparent display medium, wherein the image of the effect corresponds to the shopping experience of the second party during payment;
means for determining whether or not a total amount for the products for which input of the identification information has been received is below a predetermined amount, and in a case that the total amount is below the predetermined amount, displaying an image on the transparent display medium indicating that the total amount is below the predetermined amount, and displaying an image on the transparent display medium introducing a product with which the predetermined amount is reached; and
means for controlling communication between a point of sale (POS) terminal and a display device that includes the transparent display medium and a projection device, wherein the projection device projects the images onto the transparent display medium based on control from the POS terminal, and wherein the projection device is disposed in a position where light projected by the projection device is not emitted onto the first party or the second party.

* * * * *